US012394232B2

(12) United States Patent
Amamou

(10) Patent No.: US 12,394,232 B2
(45) Date of Patent: Aug. 19, 2025

(54) SYSTEMS AND METHODS FOR AUTOMATED TEXT LABELING

(71) Applicant: UBIAI, Inc., Carlsbad, CA (US)

(72) Inventor: Walid Amamou, Carlsbad, CA (US)

(*) Notice: Subject to any disclaimer, the term of this patent is extended or adjusted under 35 U.S.C. 154(b) by 331 days.

(21) Appl. No.: 17/938,556

(22) Filed: Oct. 6, 2022

(65) Prior Publication Data

US 2024/0127617 A1 Apr. 18, 2024

(51) Int. Cl.
*G06V 30/19* (2022.01)

(52) U.S. Cl.
CPC .. *G06V 30/19133* (2022.01); *G06V 30/19147* (2022.01); *G06V 30/1916* (2022.01)

(58) Field of Classification Search
None
See application file for complete search history.

(56) References Cited

U.S. PATENT DOCUMENTS

| 2021/0133279 | A1* | 5/2021 | Shirani | G06F 40/279 |
| 2022/0351089 | A1* | 11/2022 | Ho | G06N 3/04 |
| 2024/0127617 | A1* | 4/2024 | Amamou | G06V 30/19133 |

* cited by examiner

*Primary Examiner* — Edward Park

(57) ABSTRACT

Methods and systems are provided for labeling text data using one or more machine learning (ML) models. In one embodiment, a method for training an ML model to label text data comprises manually labeling one or more words in a portion of a first set of text data as instances of a predefined entity of interest; extracting one or more example phrases from the labeled portion of text data, submitting an instruction to a Large Language Model (LLM) to label instances of the predefined entity of interest in the first set of text data, the instruction including the one or more example phrases; and training an ML model to label instances of the predefined entity of interest in a second set of text data, using training data including labeled text data of the first set of text data, the labeled text data outputted by the LLM.

9 Claims, 10 Drawing Sheets

FIG. 7

SYSTEMS AND METHODS FOR AUTOMATED TEXT LABELING

TECHNICAL FIELD

Embodiments of the subject matter disclosed herein relate to automated processes for labeling text data, and more specifically, to generating labeled datasets for supervised learning.

BACKGROUND

Machine learning (ML) models may be used to identify entities of interest (e.g., text expressions of a certain type) in text data. The identified entities may be extracted and stored in a structured format, such as a relational database, to efficiently support searching, displaying and processing the text data. Additionally, the identified entities may be used for tasks such as relation extraction, document classification, and/or others.

A bottleneck of supervised ML may be generating labeled text data sets, which may rely on manual labeling of documents. Manual annotation may be time-consuming, laborious, and expensive, as it may entail dedicating a considerable amount of subject matter expert (SME) time to curate and annotate text documents to generate sufficient data to train high-quality ML models with the ability to solve complex business problems. Manual annotation of text data may include locating entities of interest in the text data, and inserting labels (e.g., as in a markup language) around the entities of interest. An entity of interest may include one or more additional entities of interest in a nested fashion, which may further complicate and slow down the manual annotation.

Technological advances in natural language processing have led to a new wave of innovative applications based on Large Language Models (LLM), for content writing, unsupervised document classification, sentiment analysis, question answering, and other tasks. In theory, the LLMs could be leveraged to automate labeling of entities in unstructured text. However, while a performance of LLMs at language tasks may be high, LLM's may be expensive and potentially cost-prohibitive to run in production due to a large size of these models (e.g., up to 175 billion parameters) and an amount of computational power consumed during use. Additionally, a generic LLM may be too resource intensive to fine-tune to serve a specific business need in domains such as healthcare, HR, and finance. Further, the output of an LLM may not be predictable and consistent, which may preclude use in some domains, such as healthcare.

SUMMARY

The current disclosure at least partially addresses one or more of the above identified issues by a method for training an (ML) model to label text data comprises manually labeling one or more words in a portion of a first set of text data as instances of a predefined entity of interest; extracting one or more example phrases from the labeled portion of text data, each example phrase of the one or more example phrases including at least one labeled instance of the predefined entity of interest; submitting an instruction to a Large Language Model (LLM) to label instances of the predefined entity of interest in the first set of text data, the instruction including the one or more example phrases; and training an ML model to label instances of the predefined entity of interest in a second set of text data, using training data including labeled text data of the first set of text data, the labeled text data outputted by the LLM.

By leveraging natural language processing (NLP) capabilities of the LLM to label instances of entities, relations, and document classes in training data, a time, effort, and cost spent manually annotating text data to generate a training set may be reduced. Additionally, each of the steps involved in training the ML model, including defining the entities of interest, manually curating instructions and example text to submit to the LLM, processing an output of the LLM using various algorithms, and manually verifying and when necessary, correcting the output of the LLM to increase a quality of the output, may be managed using various graphical user interfaces (GUIs) of a single, integrated text annotation system. A user may log into the text annotation system, and easily and efficiently build, train, and deploy ML models to label text documents in various domains or for various tasks by dragging, dropping, and connecting icons representing different data processing steps (e.g., data labeling steps, NLP tools, training and test set development tools, etc.), where the different processing steps are carried out on the text annotation system. By using the single integrated text annotation system, computational resources may be more efficiently allocated to different annotation tasks via a seamless, end-to-end process, as compared to an alternative scenario where the tasks are performed by different independent software applications. Additionally, by providing a master GUI within which various different models, dictionaries, NLP tools, manual annotation tools, and other tools may be selected and used, manual steps in an annotation process may be performed more quickly and easily. Trained models and customized tools and configurations may be saved in the text annotation system for future use. In this way, an overall amount of cost and time spent in building and deploying ML models for entity recognition, relation extraction, and document classification may be reduced.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which:

FIG. 7 shows an example GUI for resolving conflicts in manually labeled entities in text documents, in accordance with one or more embodiments of the present disclosure.

Figure 1A:
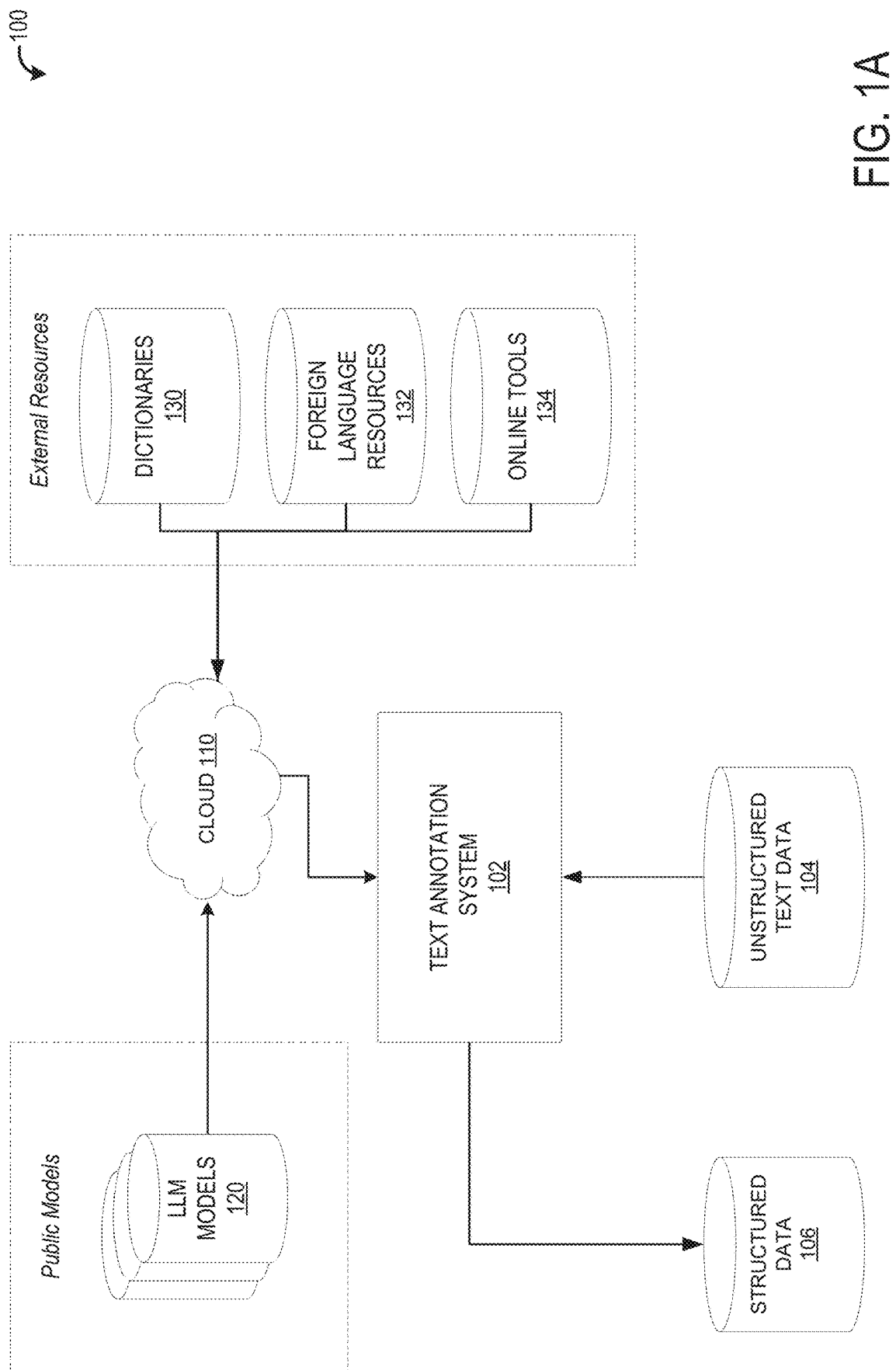
FIG. 1A shows a block schematic diagram of an exemplary entity extraction system, in accordance with one or more embodiments of the present disclosure.

The drawings illustrate specific aspects of the described systems and methods. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

Systems and methods are disclosed herein for labeling entities of interest in text data, using an integrated text annotation system that leverages natural language processing (NLP) capabilities of a Large Language Model (LLM) to train a machine learning (ML) model to identify the entities of interest.

Automation of various business and other processes may rely on NLP for tasks such as document classification, relation extraction, and entity extraction. For example, in entity extraction, instances of entities of interest included in text documents (e.g., unstructured text) may be extracted and stored in a format that is highly organized and searchable (e.g., structured text), such as in a relational database. An entity of interest (also referred to herein as an entity) may be a classification, categorization, or label associated with a text expression (e.g., a word or combination of words) found in the unstructured text. For example, phone numbers in the unstructured text may be instances of a first entity "phone number", or addresses in the unstructured text may be instances of a second entity "address".

With entity extraction, extracting entities is typically accomplished via a process including several steps. A first set of text data (e.g., documents) may be manually annotated to obtain labeled data, where instances of selected entities are identified in the text documents. The labeled data may then be used to train a model, such as an ML model, to automatically label the selected entities in a subsequent sets of text documents. After the entities have been labeled in the subsequent sets of the text documents, the entities may be extracted by a computer program and stored in a desired format for use by one or more software applications. For example, one entity of interest in a dataset of job applicant resumes may be "job title". A hiring manager of a company may search the dataset of job applicant resumes for instances of the entity "job title", where labeled instances of "job title" in the dataset may be returned. Similar processes may be followed for relation extraction and document classification.

The manual annotation by human experts may be cumbersome and time consuming. Different human experts may use different terms when annotating a desired entity, where conflicts may have to be resolved prior to model training. The manual annotation may be carried out using various systems and/or software applications, and may include steps and scheduling activities that are not easily automated. As described herein, a time and a complexity of the manual annotation process may be reduced by leveraging an LLM's language processing capabilities. Rather than manually labeling the first set of text documents, an initial labeling of first set of text documents may be performed by the LLM, which may decrease or eliminate an amount of time spent labeling data in a subsequent manual annotation step. The labeled data may then be used to train a smaller ML model, which may be customized for a specific domain or type of data.

Publicly available LLMs are trained on enormously large datasets and are capable of generating text content based on simple commands. Natural language processing capabilities of the LLM may be leveraged using techniques referred to as Zero Shot, One Shot, or Few Shot Learning. Unlike supervised learning, where human experts manually label a large dataset to fine-tune a model, these techniques may rely on a minimal number of examples. Typically, the LLM is given a prompt, which includes a written instruction (e.g., a command) regarding what kind of output is sought. For example, the instruction may be "generate a description of Los Angeles". The LLM may receive the prompt, and in response, the LLM may generate a sentence describing Los Angeles.

When more specific text content is desired, one or more examples of a desired output may be included in the prompt, along with the instruction. For example, a first description of Los Angeles may be appropriate for a travel magazine; a second description of Los Angeles may be appropriate for an article on urban planning; a third description of Los Angeles may be appropriate for an article about homelessness and crime; and so on. To generate text content of a desired type or style, one or more examples of target sentences may be provided to the LLM in the prompt, and the LLM may generate sentences similar to the target sentences. By providing the examples, an output of the LLM may more closely meet a user's demands for a specific type of text content. In zero shot learning, the prompt includes an instruction, but does not include any examples. In one shot learning, the prompt includes an instruction and a single example. In few shot learning, the prompt includes an instruction and a plurality of examples, where the number of examples is usually small (e.g., 2-10).

As described in greater detail herein, LLMs may be used to bootstrap an annotation process for entity extraction. A few representative examples of labeled text may be provided, and the LLM may complete the labeling based on the representative examples. Increasing the number of representative examples may increase an accuracy of the labeling. For example, an accuracy of one LLM, OpenAI's GPT-3, may be 10% when no examples are provided (e.g., zero shot labeling); 47% when a single example is provided (e.g., single shot labeling); and up to 60% when 10 examples are provided (e.g., few shot labeling).

Figure 1B:
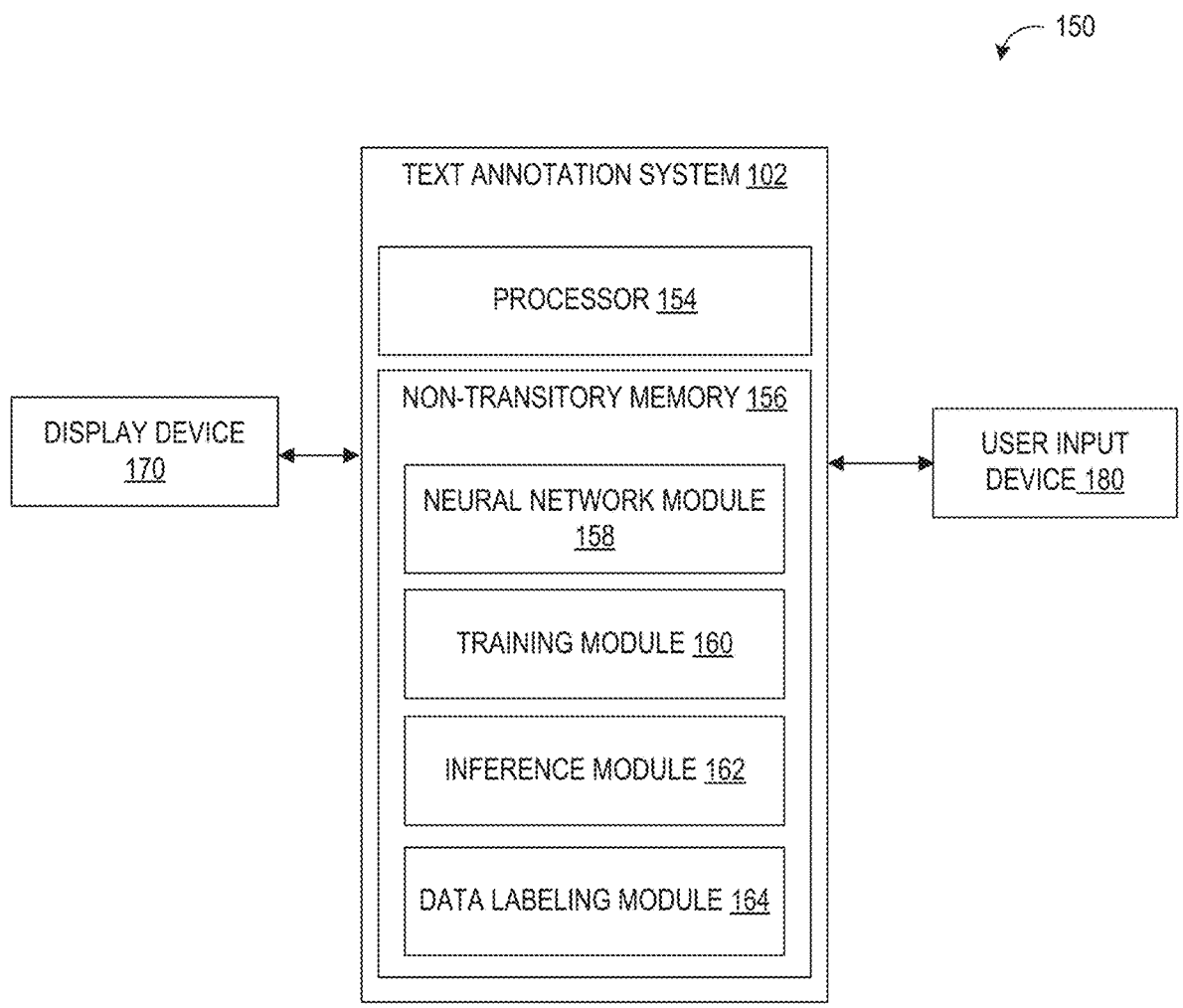
FIG. 1B shows an exploded view of an exemplary text annotation system of the entity extraction system of FIG. 1A, in accordance with one or more embodiments of the present disclosure.

An entity extraction system, such as the entity extraction system of FIG. 1A, may include a text annotation system, such as the text annotation system of FIG. 1B. Labeling of the data may be carried out using the text annotation system, by following one or more steps of the procedure described in the method of FIG. 3. The procedure may include using an LLM to pre-annotate the data, by submitting a prompt such as the prompt shown in FIG. 8. Labeling the data may include manual annotation, which may be performed by following one or more steps of the procedure described in the method of FIG. 4. The manual annotation may be performed using a GUI of the text annotation system, such as the GUI shown in FIG. 5A. The GUI of 5A may allow a user (e.g., a human expert) to label entities in an intuitive manner, in particular, when labeling nested entities, as shown in FIG. 5B. The manual annotation may be performed by a team of human annotators working independently, where an agreement between the human annotators regarding assigned labels and a determination of conflicts between labels may be assessed using the GUI shown in FIG. 6. The conflicts between assigned labels may be resolved via the GUI shown in FIG. 7.

Referring now to FIG. 1A, an entity extraction system 100 is shown, including a text annotation system 102. In some embodiments, text annotation system 102 is a web-based system accessible via an Internet browser, where the web-based system may handle various security measures for ensuring privacy and security of data during the transfer of any information from servers external to the platform to servers hosting the platform. In other embodiments, text annotation system 102 may be a standalone application. Text annotation system 102 may be configured to receive unstructured text data 104 (e.g., a set of text documents), process unstructured text data 104 based on input from a user of text annotation system 102, and output a set of structured data 106. In various embodiments, unstructured text data 104 may be proprietary data such as private documents stored, for example, on a server of the user, where the unstructured text data 104 may be uploaded onto text annotation system 102 by the user. Structured data 106 generated via the system may be exported or downloaded by the user to a proprietary database (e.g., a relational database) of the user. Structured data 106 may include labeled versions of the text documents of unstructured text data 104, wherein various text expressions found in unstructured text data 104 are labeled as instances of one or more entities of interest. In various embodiments, the entities are predefined by the user.

Text annotation system 102 provides an integrated system where various stages of an end-to-end process for labeling unstructured text may be performed, using a main GUI of text annotation system 102 and/or one or more additional GUIs for managing specific tasks during the end-to-end process. The one or more additional GUIs may be launched via the main GUI. For example, a first additional GUI may be used for annotating data, a second additional GUI may be used for resolving conflicts in annotated documents, a third additional GUI may be used for training an ML model, and so on. Additional components of text annotation system 102 may include a data labeling module and a neural network training module for training one or more ML models on labeled text data, as described below in reference to FIG. 1B.

As described in greater detail below, text annotation system 102 may rely on one or more large, publically available models for large-scale NLP processing. The one or more publically available models may include one or more Large Language Models (LLM) 120, which may be tens of gigabytes in size, may include billions of parameters, and may be trained on extremely large amounts of data (e.g., petabytes). For example, OpenAI's GPT-3 model includes 175 billion parameters. The model is based on a deep learning architecture and trained on over 490 billion tokens from Common Crawl, Web Text2, Books1, Books2 and Wikipedia. The model is hosted in OpenAI's server and is accessible via API. There are over 9 GPT-models available for use for public.

For various annotation-related tasks, text annotation system 102 may rely on external resources, such as one or more online dictionaries 130, foreign language resources 132, and/or other online tools 134. The various external resources may be accessed via a cloud 110 (e.g., over the Internet) and may be public or private. In some embodiments, the external resources may be used to refine an input to an LLM model 120, prior to training an ML model. For example, after text documents of unstructured text 104 have been uploaded to text annotation system 102, a pre-annotation step may be carried out where an initial annotation of the uploaded (and/or processed via OCR) text documents may be performed in an automated manner based on one or more rule-based algorithms (e.g., regular expressions, dependency matching, phone numbers, emails, etc.), which may be configurable and/or customizable by a user of text annotation system 102. For example, the user may select a desired type of rule-based algorithm from a menu of a GUI of text annotation system 102, and configure the rule-based algorithm via one or more pop-up dialog boxes generated by the GUI. The initial annotation may rely on one or more dictionaries, such as online dictionaries, ontologies, reference sites on the Internet, or other sources depending on a domain of the text documents. Pre-annotation using rule-based algorithms is described in greater detail below in reference to FIG. 3.

Annotation of unstructured text data 104 may include collaborative annotation, where the user may use text annotation system 102 to assign text documents to different team members (e.g., human experts) to be annotated. After annotation, the user may receive annotated documents from the different team members, and use a conflict-resolution tool of text annotation system 102 to harmonize and standardize the annotations provided by the team.

The user may select an ML model via a menu of a GUI of text annotation system 102 to train to identify a desired set of entities in first portion of the unstructured text data 104, using the annotated documents as input. The ML model may be selected from one or more ML models stored on servers accessible to the system via the Internet, or the ML model may be selected from one or more ML models saved on the system. For example, the user may upload, train, or customize an ML model using text annotation system 102, and then save the ML model on text annotation system 102 for use on similar data at a later time. In some embodiments, ML models that are trained or customized on text annotation system 102 may be shared or made accessible to other third parties.

When a performance of the model during training is satisfactory, the user may then deploy the trained model on a second, or subsequent portions of unstructured text data 104 uploaded to text annotation system 102, to generate the structured data 106. Alternatively, the user can download the trained model from text annotation system 102, and use the trained model to process similar text documents on a private server.

Figure 7:
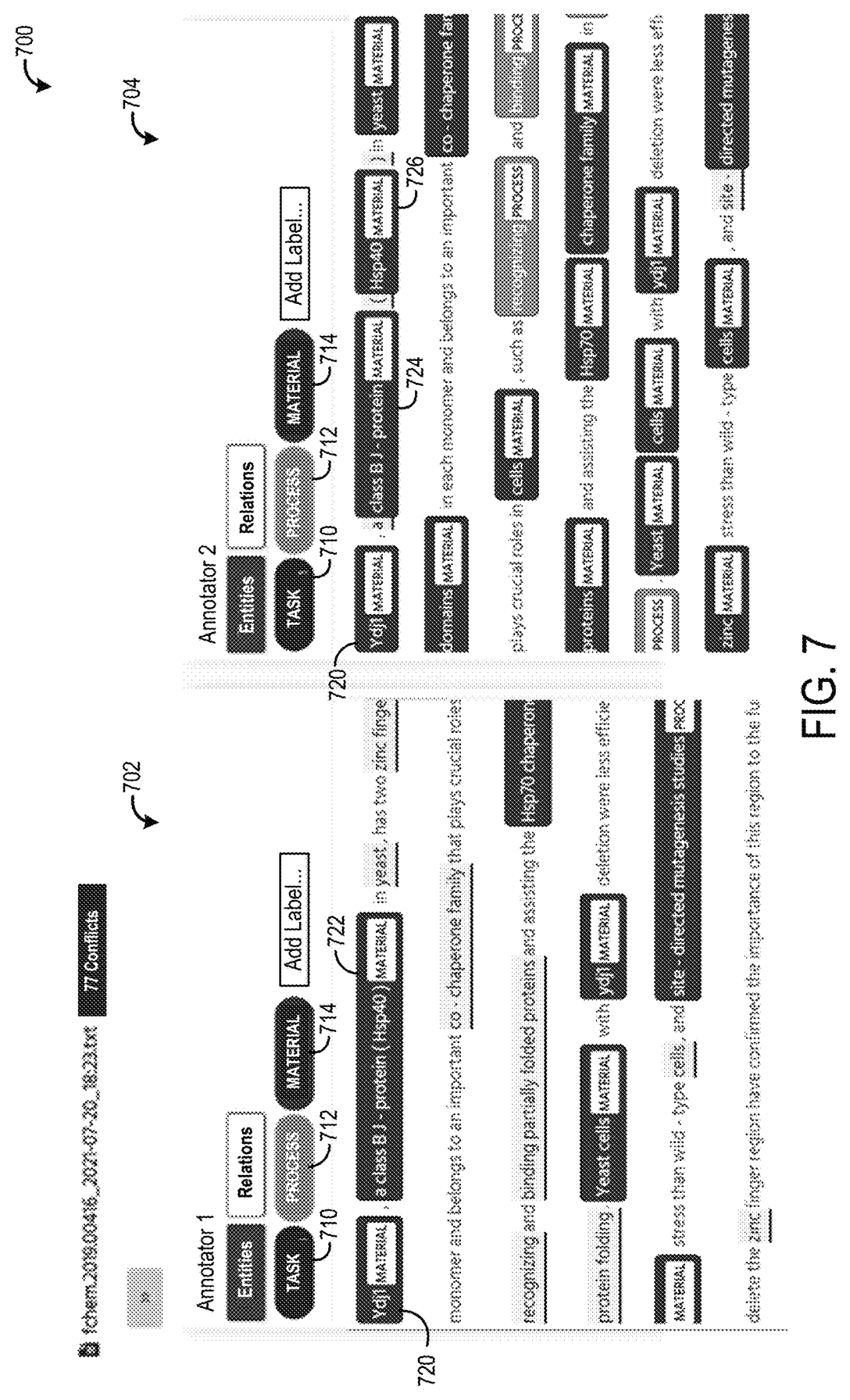

For each of the different tasks described above (e.g., data labeling, team annotation, model training, and model deployment), an interaction between the user and the system may be different. As such, different user interfaces (e.g., GUIs) may be provided by the system to perform different tasks. For example, a first GUI may be provided for manual annotation of documents during the data labeling stage; a second GUI may be provided for resolving conflicts during the team collaboration stage; a third GUI may be provided for configuring and training one or more ML models on the annotated data; a fourth GUI may be provided for annotating OCR documents; a fifth GUI may be provided that allows users to drag, drop, and connect various data processing modules together to create customized workflows; and so on. For example, in various embodiments, the annotation may be performed using the GUI shown in FIGS. 5A and 5B. Examples of GUIs used for collaborative annotation and resolving conflicts in annotations are shown in FIGS. 6 and 7.

By providing a single, integrated system where the user can perform various tasks within an end-to-end process for extracting entities from the unstructured text data 104, text annotation system 102 may reduce an amount of time spent by the user preparing and annotating the data and configuring and training the ML models. Additionally, each time the data is processed by a different software application, memory and processing resources may be reallocated. By performing the tasks entailed by each stage of an entity extraction process on a single compute instance, computing resources may be efficiently managed, reducing processing time and associated costs.

Referring now to FIG. 1B, a block diagram 150 shows an exploded view of text annotation system 102 of FIG. 1A. Text annotation system 102 may include a non-transitory memory 156 and one or more processors 154, which may perform entity extraction and/or annotation tasks based on instructions stored in non-transitory memory 156.

Memory 156 may include one or more data storage structures, such as optical memory devices, magnetic memory devices, or solid-state memory devices, for storing programs and routines executed by processor(s) 154 to carry out various functionalities disclosed herein. Memory 156 may include any desired type of volatile and/or non-volatile memory such as, for example, static random access memory (SRAM), dynamic random access memory (DRAM), flash memory, read-only memory (ROM), etc. Processor(s) 154 may be any suitable processor, processing unit, or microprocessor, for example. Processor(s) 154 may be a multi-processor system, and, thus, may include one or more additional processors that are identical or similar to each other and that are communicatively coupled via an interconnection bus.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent hardware that operates based on software or hardwired instructions, the software that directs the hardware to perform the operations, or a combination thereof. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

One or more of the devices described herein may be implemented over a cloud or other computer network. For example, text annotation system 102 is shown in FIG. 1B as constituting a single entity, but it is to be understood that text annotation system 102 may be distributed across multiple devices, such as across multiple servers that may be located at different locations and connected via a network, such as cloud 110 of FIG. 1A. In some embodiments, non-transitory memory 156 may include components disposed at two or more devices, which may be remotely located and/or configured for coordinated processing. In some embodiments, one or more aspects of non-transitory memory 156 may include remotely-accessible networked storage devices configured in a cloud computing configuration.

Non-transitory memory 156 may store a neural network module 158. Neural network module 158 may include at least one ML model (e.g., a neural network), and instructions for implementing the ML model to label entities in text data, as described in greater detail below. Neural network module 158 may include trained and/or untrained neural networks and may further include various data, or metadata pertaining to the one or more neural networks stored therein.

Non-transitory memory 156 may further store a training module 160, which may comprise instructions for training one or more of the neural networks stored in neural network module 158. In some embodiments, training module 160 may include instructions for implementing one or more gradient descent algorithms, applying one or more loss functions, and/or training routines, for use in adjusting parameters of one or more neural networks of neural network module 158. Training module 160 may include training datasets for the one or more neural networks of neural network module 158.

Non-transitory memory 156 also stores an inference module 162. Inference module 162 may include instructions for deploying a trained ML model to label entities in unstructured text data (e.g., unstructured text data 104). For example, inference module 162 may include instructions that when executed, enter the unstructured text data into the trained ML model to generate labeled text. Inference module 162 may include further instructions that when executed, extract labeled entities from the labeled text; display the extracted entities on a display device (e.g., display device 170); and/or store the extracted entities in a database.

Non-transitory memory 156 further stores data labeling module 164. Data labeling module 164 may include instructions for performing various tasks to support manual annotation of the unstructured text data. For example, data labeling module 164 may include instructions that when executed, display the unstructured text data in one or more GUIs including annotation tools for a user to annotate the unstructured text data, and manage and store annotated text data generated using the one or more GUIs. The one or more GUIs may include a GUI that allows the user to label entities manually, such as the exemplary GUIs shown in FIGS. 5A and 5B; GUIs for managing collaborative annotation by a team of users, such as the exemplary GUIs shown in FIG. 6; and/or a GUI for resolving conflicts between different annotations of a same entity by different human experts, such as the exemplary GUI shown in FIG. 7.

Text annotation system 102 may receive input from a user via a user input device 180, and the user may interact with text annotation system 102 and view an output of text annotation system 102 on a display device 170. User input device 180 may comprise one or more of a touchscreen, a keyboard, a mouse, a trackpad, a motion sensing camera, or other device configured to enable a user to interact with and manipulate data within text annotation system 102. Display device 170 may include one or more display devices utilizing virtually any type of technology. In some embodiments, display device 170 may comprise a computer monitor, and may display ultrasound images. Display device 170 may be combined with processor 154, non-transitory memory 156, and/or user input device 180 in a shared enclosure, or may be peripheral display devices and may comprise a monitor, touchscreen, projector, or other display device known in the art, which may enable a user to view unstructured and/or structured data, GUIs and/or annotation tools, and/or interact with various data stored in non-transitory memory 156.

While not specifically shown in FIG. 1B, devices described herein (e.g., display device 170) may include other user input devices, memory, and/or processors, similar to memory 156 and processor(s) 154 described above, and thus the description of memory 156, and processor(s) 154 likewise applies to the other devices described herein. It should be understood that text annotation system 102 shown in FIG. 1B is for illustration, not for limitation. Another appropriate text annotation system may include more, fewer, or different components.

Figure 2:
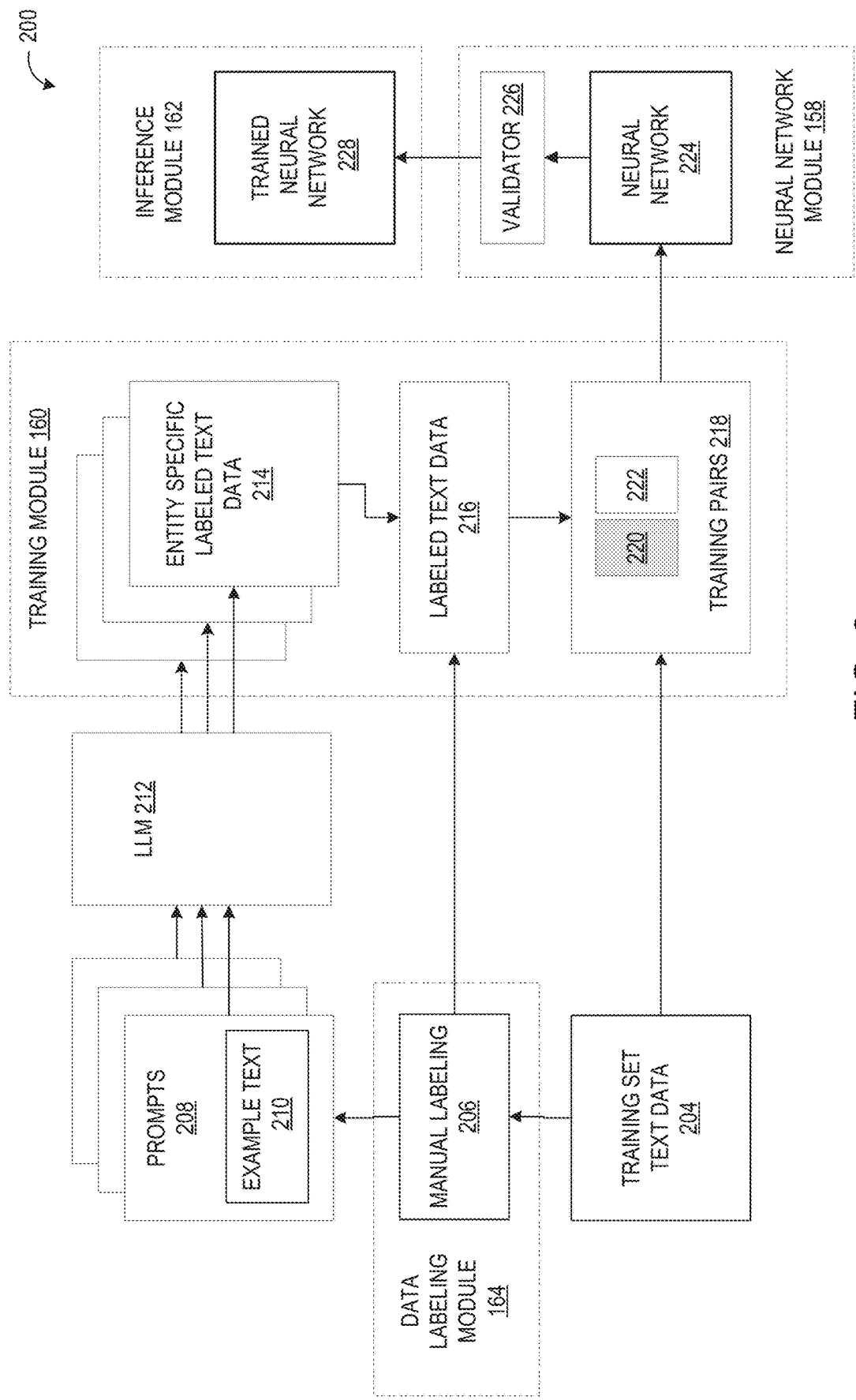
FIG. 2 shows an block schematic diagram of an exemplary neural network training system for training an ML model to identify entities in text data, in accordance with one or more embodiments of the present disclosure.

FIG. 2 shows an exemplary neural network (NN) training system 200. NN training system 200 may be implemented by or within an text annotation system, such as text annotation system 102 of FIGS. 1A and 1B, to train one or more neural networks to label instances of entities of interest in unstructured text, such as unstructured text data 104 of FIG. 1A. In one embodiment, a neural network 224 is trained in a neural network module of the text annotation system (e.g., neural network module 158 of FIG. 1B), using a training set generated and stored in a training module of the text annotation system (e.g., training module 160). After training, a trained neural network 228 may be stored in an inference module of the text annotation system (e.g., inference module 162).

Prior to generation of the training set, a manual labeling task 206 may be performed on text data 204, where text data 204 is designated for generating the training set. The text data 204 may be similar to, or drawn from unstructured text data 104 of FIG. 1A. For example, the text data 204 may be a first set of unstructured text data 104 uploaded to the text annotation system to be used for training neural network 224, and trained neural network 228 may be used to label a subsequent sets of unstructured text data 104 uploaded to the text annotation system, for example, to extract entities from the subsequent sets.

In some embodiments, text data 204 may be assembled and/or curated to meet certain criteria. For example, text data 204 may be assembled and/or curated to include instances of certain entities; to have a target number or target distribution of the certain entities; and so on. The criteria may be established by human experts to facilitate training neural network 224.

In some embodiments, manual labeling task 206 may be performed on an entirety of text data 204 to generate a set of labeled text data 216, where labeled text data 216 is a version of text data 204 with instances of entities of interest identified by labels. For example, in some scenarios, various automated labeling processes (such as those described herein) may not generate labeled text data of a sufficient quality for training neural network 224. Manual labeling task 206 may be performed by human experts using one or more GUIs of the text annotation system, as described below in reference to FIG. 4. Insertion of the labels may be performed by blocks of computer code stored in a memory of the text annotation system, such as in data labeling module 164 of FIG. 1B.

In other embodiments, manual labeling task 206 may not be performed on the entirety of text data 204 to generate a set of labeled text data 216. For example, a size of text data 204 may be prohibitively large given a size of a team of human experts. As an alternative to manually labeling the entirety of text data 204, manual labeling task 206 may entail labeling a portion (e.g., a subset) of text data 204. The labeled portion of text data 204 may be used to generate one or more prompts 208, which may each be entered as input along with text data 204 into an LLM 212. For each prompt, LLM 212 may label the remaining text data 204 (e.g., that is not included in the labeled portion) based on an instruction included in the prompt. Each prompt may include one or more examples 210 of labeled text to help "guide" LLM 212 to output more accurate labels, where the one or more examples 210 are drawn from the labeled portion of text data 204. For each prompt, LLM 212 may output relation-specific, document classification, and/or entity-specific labeled text data 214. The labeled text data 214 outputted for each prompt may then be combined to create a set of labeled text data 216, where labeled text data 216 includes labeled instances of various entities, relations, etc., as described above. It should be appreciated that while the methods and systems disclosed herein are frequently described with respect to entity extraction, the methods and systems may also apply to relation extraction and document classification tasks.

Labeled text data 216 and text data 204 may be paired to create a plurality of training pairs 218, where each training pair 218 includes an excerpt 220 of unlabeled text from text data 204, and a corresponding excerpt 222 of labeled text from labeled text data 216. In other words, each excerpt 220 and 222 of each training pair 218 may include the same text content, where excerpt 220 may include instances of entities that are not labeled, and excerpt 222 may include instances of entities that are labeled. Excerpts 220 may be used as input data into network 224, and excerpts 222 may be inputted into network 224 as ground truth data. In various embodiments, the excerpts may be sentences, or phrases, or multi-word text expressions.

Once the training pairs 218 have been generated, the training pairs 218 may be assigned to either a training dataset or a test dataset. The test dataset may be used to validate a performance of neural network 224. Validation may prevent overfitting, whereby neural network 224 learns to map features specific to samples of the training set that are not present in the test set.

In some embodiments, the training pairs 218 may be randomly assigned to either the training dataset or the test dataset in a pre-established proportion. For example, 90% of the training pairs 218 generated may be assigned to the training dataset, and 10% of the training pairs 218 generated may be assigned to the test dataset. In other embodiments, different proportions of training pairs 218 may be assigned to the training dataset and the test dataset. It should be appreciated that the examples provided herein are for illustrative purposes, and the training pairs 218 may be assigned to the training dataset or the test dataset via a different procedure and/or in a different proportion without departing from the scope of this disclosure.

Neural network training system 200 may be implemented to train neural network 224 to learn to label the excerpts 220 in the manner indicated by excerpts 222. Neural network 224 may be configured to receive the training pairs 218 from the training module 160, where excerpts 220 and 222 are inputted into neural network 224. For a given excerpt 220, an output of neural network 224 may be compared with excerpt 222. One or more parameters of neural network 224 may be iteratively adjusted in order to minimize a loss function based on a difference between the output and excerpt 222, until an error rate decreases below a first threshold error rate.

Neural network training system 200 may include a validator 226 that validates a performance of neural network 224. Validator 226 may take as input a trained or partially trained neural network 224 and a test dataset of training pairs 218. If the error rate of the trained or partially trained neural network 224 on the test dataset of training pairs 218 decreases below a second threshold error rate, the performance of the trained or partially trained neural network 224 may be validated, whereby the trained neural network 224 may be stored in inference module 162 as a trained neural network 228. Trained neural network 228 may subsequently be used to label new text data similar to text data 204, for example, as part of an entity extraction process carried out via the text annotation system.

Figure 3:
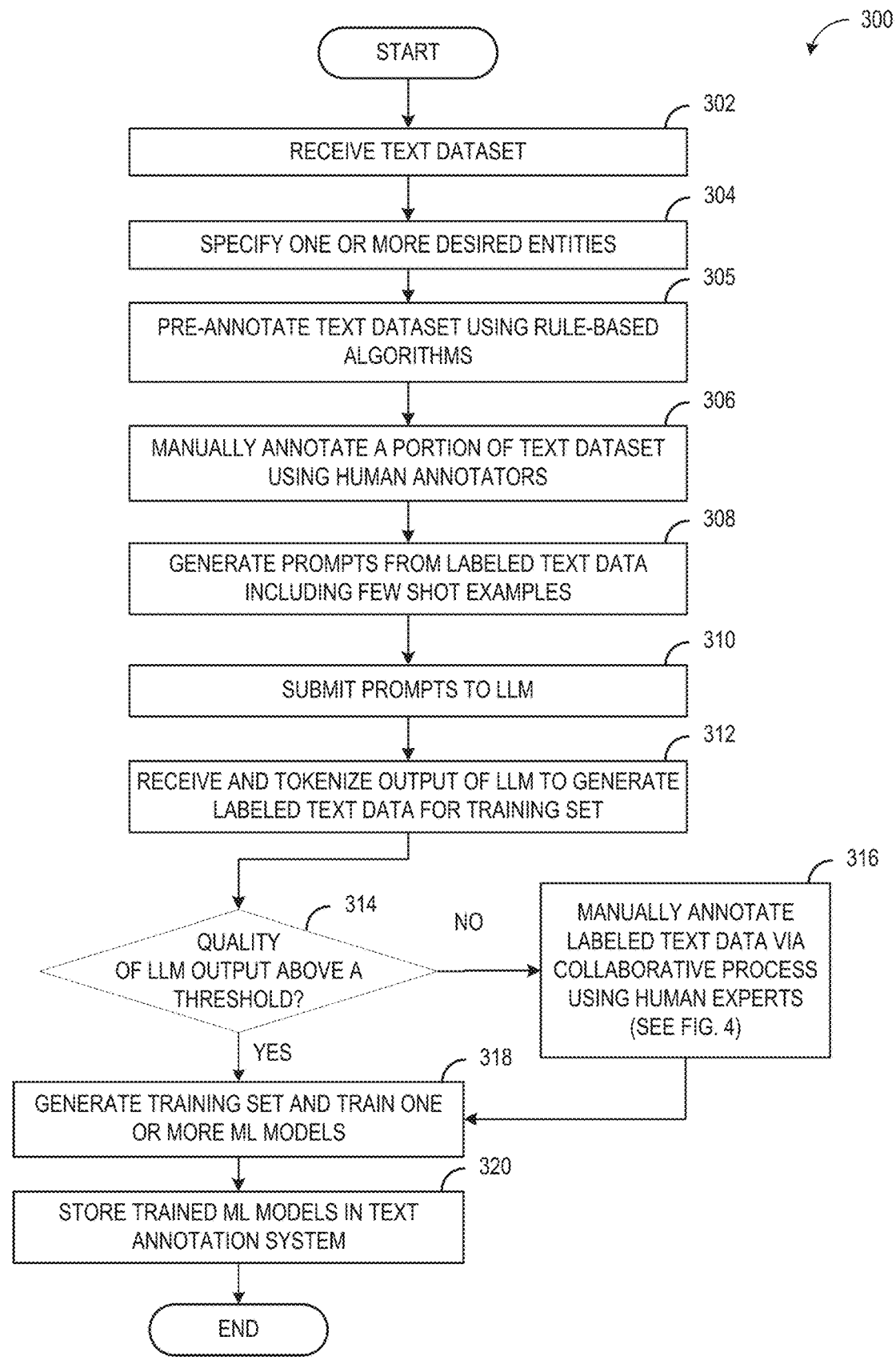
FIG. 3 is a flowchart illustrating an exemplary method for labeling text data using an LLM, in accordance with one or more embodiments of the present disclosure.

Referring now to FIG. 3, an exemplary high-level method 300 is shown for labeling unstructured text data using one or more ML models, where the one or more ML models are trained on training sets that are generated with the aid of an LLM (e.g., LLM 212). More specifically, a labeled training set of text data may be generated in an automated process based on a few shot labeling approach using the LLM, for example, when it is unfeasible or undesirable for a total amount of unstructured text to be labeled manually to train the one or more ML models. In other embodiments, the few shot labeling approach may not generate labeled text data of sufficient quality, whereby the unstructured text data may be labeled via a manual approach, such as the approach described in reference to FIG. 4 below. The ML models may be non-limiting examples of neural network 224 of FIG. 2.

The automated process may include human intervention, such as for labeling a portion of text. Method 300 may be carried out using an text annotation system, such as text annotation systems 102 of FIGS. 1A and 1B. Some steps of method 300 may be performed by human experts using one or more GUIs of the text annotation system, and some steps of method 300 may be executed by a processor (e.g., processor 154) of the text annotation system. For example, some steps of method 300 may be executed based on instructions stored in a neural network module of the text annotation system, such as neural network module 158, and/or instructions stored in a data labeling module of the text annotation system, such as data labeling module 164.

Method 300 begins at 302, where method 300 includes receiving a text dataset (e.g., the unstructured text data 104). In various embodiments, the text dataset may include one or more text documents. The text dataset may be extracted from one or more public or private databases, and may include, for example, files, reports, briefs, and/or other text materials relating to various domains (e.g., business, legal, finance, medicine, etc.). The text dataset may include text in one or more languages, and may be structured in various formats. For example, a first text document may have a first format, including sentences and/or paragraphs of text; a second text document may have a second format, where elements of text are listed in an order; a third text document may have a third format, including text organized in fields positioned at various locations on a page (e.g., such as bills, invoices etc.); a fourth text document may include various elements of the first, second, and/or third formats (e.g., resumes); and so on. In general, the text dataset may be or include text data with any of various different types of content and/or formatting.

At 304, method 300 includes specifying one or more entities of interest that are desired to be labeled in the text dataset. An entity of interest (also referred to herein as an entity) may be a classification, categorization, or label associated with a text expression (e.g., a word or combination of words) found in the text dataset. As an example, the text dataset may include various resumes of various candidates for employment positions at one or more companies. The text dataset may be used to train an ML model to label job titles in the various resumes, to support an entity extraction task where instances of job titles are extracted from the resumes. For example, a manager of the company may wish to use the text annotation system to review the candidates based on a job title held by each candidate. The manager may wish to extract the job titles of each candidate from the various resumes, using the text annotation system. The manager may specify "job title" as an entity of interest, and command the text annotation system to extract instances of job titles from the resumes. The instances may then be displayed on a display screen of the text annotation system, or stored in a database, or used in further processing. In general, various entities of interest may be specified to support various entity extraction tasks.

At 305, method 300 includes pre-annotating the text dataset using one or more rule-based algorithms. The one or more rule-based algorithms may be stored in the text annotation system (e.g., in data labeling module 164). In some embodiments, the rule-based algorithms may be configurable and/or customizable by a user of the text annotation system. The rule-based algorithms may be used to standardize, harmonize, or increase an accuracy of text expressions included in the text dataset.

For example, a first rule-based algorithm stored on the text annotation system (and/or configured by the user) may define a pattern of language or text including an entity, using a regular expression. If language or an expression relating to the entity in the text dataset does not match the language pattern defined by the regular expression, the language or expression may be changed to match the language pattern. For example, a regular expression may define a phone number. If a phone number in the text dataset adheres to the regular expression, the phone number may not be changes. Alternatively, if the phone number in the text dataset does not adhere to the regular expression (e.g., an alternative format, etc.), the phone number may be changed to the match a format established by the regular expression, and/or the phone number may be flagged for review during subsequent manual annotation.

The rule-based algorithms may use or rely on resources external to the text annotation system, such as the dictionaries 130, foreign language resources 132, and/or online tools 134 (e.g., domain specific reference sites, ontologies, etc.). It should be appreciated that the examples described herein are for illustrative purposes, and other types of rule-based algorithms may be used to label the text dataset without departing from the scope of this disclosure.

At 306, method 300 includes manually annotating a first portion of the text dataset using human annotators. The first portion may include examples of sentences or phrases in the text dataset that are representative of a content of the text dataset, and that include instances of an entity of interest. For example, the portion may include sentences that include phrases commonly found in the text dataset, and/or sentences structured in a manner similar to other sentences of the text dataset. The first portion of the text dataset may be small relative to a size of the text dataset. For example, the text dataset may include a plurality of documents each including thousands of words, and the portion may include a small number of sentences extracted from the plurality of documents, where the small number of sentences may be representative of text content of the text dataset. In various embodiments, the small number may be 10, or 50, or 100, or 5, or 1. The portion of text may be single words such as a person name, organization name, or phrases comprised of multiple words, or entire sentences, or paragraphs.

During manual annotation, the human annotators may review the text dataset, select words, sentences and/or expressions from the text dataset, and label words or phrases that are instances of the entities of interest in the selected sentences and/or expressions. The human annotators may be experts in a domain or field of interest of the unstructured text, such as a doctor, attorney, engineer, etc. A result of the manual annotation may be an amount of labeled text data, where entities of the labeled text data are identified by labels inserted by the human experts. In some embodiments, the manual annotation may be performed using a GUI of the text annotation system, such as the GUI shown in FIG. 5A. In some embodiments, the manual annotation may be performed as a collaborative process, as described below in reference to FIG. 4.

At 308, method 300 includes generating prompts (e.g., prompts 208) from the labeled text data, where each prompt may include an instruction to be provided to an LLM, to facilitate labeling of a second, remaining portion of the text dataset. The second, remaining portion may be larger than the first portion of the text dataset. For example, the first portion may include 5 example sentences, and the second portion of the text dataset may be hundreds, thousands or millions of sentences.

The instruction may include and/or indicate an entity of interest to extract from the text dataset. For example, the text dataset may include customer data, the entity of interest may be phone numbers, and the instruction may be "Extract phone numbers from customer data". Additionally, each prompt may include one or more examples (e.g., few shot examples), which may aid the LLM in labeling an entity of interest. Each few shot example may include a representative sentence or phrase taken from the text dataset, and an indication of an example instance of an entity found in the representative sentence or phrase.

Figure 8:
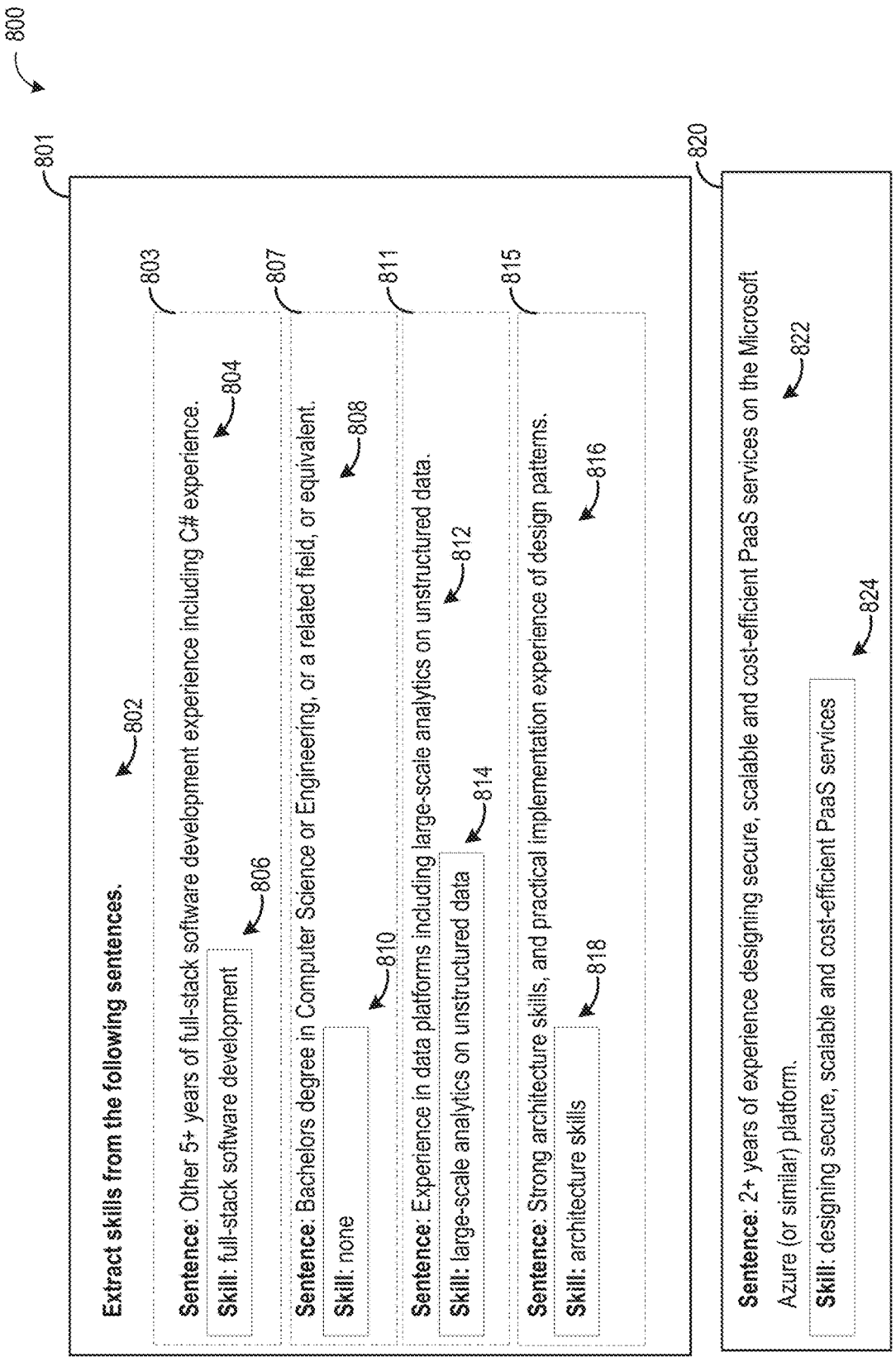
FIG. 8 shows example data for training an LLM to identify instances of entities in text data, in accordance with one or more embodiments of the present disclosure.

Referring briefly to FIG. 8, an LLM input/output diagram 800 shows an example prompt 801 to be entered as input into an LLM, to extract instances of an entity of interest from text data inputted into the LLM concurrently with prompt 801, and an example output 820 of the LLM generated from prompt 801.

Example prompt 801 includes an instruction 802, which indicates the entity of interest to be extracted (e.g., "skills") from a total set of sentences and/or phrases included in the dataset. Additionally, example prompt 801 includes four few shot examples, where each of the four few shot examples includes a sentence, and target text from the sentence that is desired to be extracted. Specifically, a first example 803 includes a first sentence 804 and a first target text 806; a second example 807 includes a second sentence 808 and a second target text 810; a third example 811 includes a third sentence 812 and a third target text 814; and a fourth example 815 includes a fourth sentence 816 and a fourth target text 818. In some cases, such as with second target text 810, the target text may not be included in the corresponding sentence.

Sentences 804, 808, 812, and 816 may be taken from the dataset. Sentences 804, 808, 812, and 816 may be representative sentences of the total set of sentences included in the dataset, where other sentences included in the dataset may share a style or structure with sentences 804, 808, 812, and 816. For example, sentence 804 may be similar to other examples of a sentence including a number of years performing a task. Sentence 808 may be similar to other examples of a sentence not including a skill. Sentence 812 may be similar to other examples of experience claimed by a person. Sentence 816 may be similar to other examples where skills are explicitly mentioned.

When prompt 801 is entered into the LLM, the LLM may proceed to review each sentence of the dataset and determine whether an instance of the desired entity "skill" is present in the sentence. If a skill is found in the sentence, the skill may be extracted. For example, example output 820 includes a sentence 822 of the sentences included in the dataset, and an extracted instance 824 of the entity "skill" (e.g., "designing secure, scalable and cost-efficient PaaS services") from sentence 822.

In some embodiments, prompt 801 may include an instruction to extract instances of a plurality of different entities from text data. For example, an alternative instruction 802 may be, "Extract entities from the following paragraph, leaving original words". First example 803 may include a first paragraph, and a corresponding target text 806 may include a listing of entities/instances in the first paragraph. For example, the first paragraph may be:

"Paragraph: 8+ years demonstrated experience in designing and developing enterprise-level scale services/solutions. 3+ years of leadership and people management experience. 5+ years of Agile Experience Bachelors degree in Computer Science or Engineering, or a related field, or equivalent alternative education, skills, and/or practical experience Other 5+ years of full-stack software development experience to include C# (or similar) experience with the ability to contribute to technical architecture across web, mobile, middle tier, data pipeline and storage components. 5+ years of experience delivering scalable and resilient services at large enterprise scale, including experience in data platforms including large-scale analytics on relational, structured and unstructured data. 3+ years of experience as a SWE/Dev/Technical lead in an agile environment including 1+ years of experience operating in a DevOps model. 2+ years of experience designing secure, scalable and cost-efficient PaaS services on the Microsoft Azure (or similar) platform. Expert understanding of web services and site technologies (for example, REST APIs, HTML, CSS, JavaScript, JSON etc.) Strong architecture skills, and practical implementation experience of design patterns. Strong partnership, communication, and cross-group collaboration skills. Demonstrated ability to impact/influence engineering."

The first paragraph may be followed by an alternative target text 806, as follows:

"DIPLOMA: Bachelors
DIPLOMA_MAJOR: Computer Science
EXPERIENCE: 8+ years, 3+ years, 5+ years, 5+ years, 5+ years, 3+ years, 1+ years, 2+ years
SKILLS: designing, developing enterprise-level scale services/solutions, leadership and people management experience, Agile Experience, full-stack software development, C#, delivering scalable and resilient services, data platforms, large-scale analytics on relational, structured and unstructured data, SWE/Dev/Technical, DevOps, designing, PaaS services, Microsoft Azure."

Given the above prompt, the LLM may extract diplomas, majors, experience, and skills from additional text content (e.g., resumes) provided to the LLM as input.

Returning to method 300, the prompts may be automatically generated from the manually annotated first portion of the unstructured text data. In one embodiment, an algorithm stored in a memory (e.g., data labeling module 164 of non-transitory memory 156) of the text annotation system and executed by a processor (e.g., processor 154) of the text annotation system may reformat manually annotated sentences of the first portion into few shot examples, as described above in reference to FIG. 8. For example, for each sentence of the first portion, the algorithm may extract a labeled entity of interest; generate target text from the entity of interest; copy the sentence into the prompt without any labels; and concatenate and/or append the target text to the sentence in the prompt. In some embodiments, target text may also be added with empty values, to provide the LLM with both positive and negative examples.

At 310, method 300 includes submitting the prompts to the LLM, along with the text data dataset. The LLM may process the prompts, and generate an output in a format corresponding to the prompts. For example, the prompts may be structured as described above in reference to FIG. 8, where example sentences are followed by a target text extracted from the example sentences. The LLM may generate an output matching the format of the prompts, where sentences of the dataset are outputted followed by extracted instances of the entities of interest.

At 312, method 300 includes receiving and tokenizing the output of the LLM to generate labeled text data (e.g., the labeled text data 216 of FIG. 2) to be used to generate a training set. As described above, the output of the LLM may be in a format requested in the prompt, and may not include labeled text in a format usable for training an ML model. Therefore, the output of the LLM may be reformatted to generate the labeled text data. Specifically, for each excerpt of text outputted by the LLM, the text annotation system may search for a corresponding target text (e.g., a token) in the excerpt. When the corresponding target text is detected within the excerpt, the text annotation system may insert a first label (e.g., a first markup tag) starting at a location of the beginning of a span of the target text in the excerpt, and may insert a second label (e.g., a second markup tag) at a location of an end of the span of the target text in the excerpt, thereby labeling the target text within the excerpt. In various embodiments, the output of the LLM may include multiple labels per instance.

In various embodiments, each prompt may include instructions to identify a single entity in the text dataset, and a plurality of prompts including instructions to identify different entities may be entered as input into the LLM at different times, or may be entered as input into different LLMs. Outputs of the LLMs (e.g., the entity specific labeled text data 214) may subsequently be combined to generate a single dataset including a plurality of labeled entities of different types (e.g., the labeled text data 216) in multiple documents, as described above in relation to FIG. 2.

At 314, method 300 includes determining whether a quality of the LLM outputs exceed a threshold quality. The threshold quality may include one or more metrics established by human experts. For example, the threshold quality may be based on a percentage of a total number of instances of entities in the text dataset that are correctly and/or accurately labeled as the corresponding entity, and/or a percentage of the total number of instances of entities in the text dataset that are incorrectly and/or inaccurately labeled as the corresponding entity. In other embodiments, the probability score of the LLM output can be used to determine the accuracy of the generated label.

If at 314 it is determined that the quality of the LLM outputs exceeds the threshold quality, method 300 proceeds to 318. At 318, method 300 includes generating the training set and training the one or more ML models to identify instances of entities in the training set text dataset. Generating the training set may include generating a plurality of training pairs of labeled (e.g., ground truth) text data and unlabeled text data, as described above in reference to excerpts 220 and 222 of neural network training system 200. The training pairs may be entered as input into the one or more ML models. In various embodiments, a set of parameters (e.g., weights) of an ML model may be adjusted by applying a gradient descent algorithm, and back-propagating a difference (e.g., error) between a labeled text output of the ML model and the ground truth text data through the network to minimize the difference. In one embodiment, the neural network is based on pre-trained BERT (Bidirectional Encoder Representations from Transformers), with a transformer architecture that leverages an attention mechanism to encode and decode contextual information. To fine-tune the pre-trained model on the labeled dataset, a transfer learning technique may be used. An encoder of the network may receive labeled input, and a decoder may receive masked tokens and try to map encoded information to expected output.

Alternatively, if at 314 it is determined that the quality of the LLM outputs does not meet the threshold quality, method 300 proceeds to 316. At 316, method 300 includes manually annotating the labeled text data using human annotators. The human annotators may annotate the labeled text data using a GUI of the text annotation system, such as the GUI shown in FIGS. 5A and 5B. In various embodiments, the manual labeling may be performed in a collaborative process between a team of human experts, as described in greater detail below in reference to FIG. 4. After the labeled text data has been manually annotated, the labeled text data including the annotations inserted by the human annotators is used to generate the training set, at 318.

It should be appreciated that in various embodiments and/or scenarios, the steps of pre-annotation using rule-based algorithms, few shot labeling via the LLM, and manual annotation may be performed in an iterative or cyclical fashion. For example, in one embodiment, after manual annotation is performed at 316, new examples may be generated that are submitted to the LLM for a second few shot labeling stage, which may then be refined and/or manually annotated in a second manual annotation stage.

At 320, method 300 includes storing the trained ML models on the text annotation system for future use, and method 300 ends. In various embodiments, the trained ML models may be used to label subsequent text datasets similar and/or sharing a domain of the labeled text data. For example, the user may upload a subsequent text dataset to the text annotation system; the user may select the trained ML model from a menu of a GUI of the text annotation system (e.g., menu item 532 of GUI 500); the user may deploy the trained ML model on the subsequent text dataset; and the user may view labeled text data of the subsequent text dataset in the GUI. Entities of the labeled text data may also be extracted and stored in a database (e.g., structured data 106 of FIG. 1A).

Figure 4:
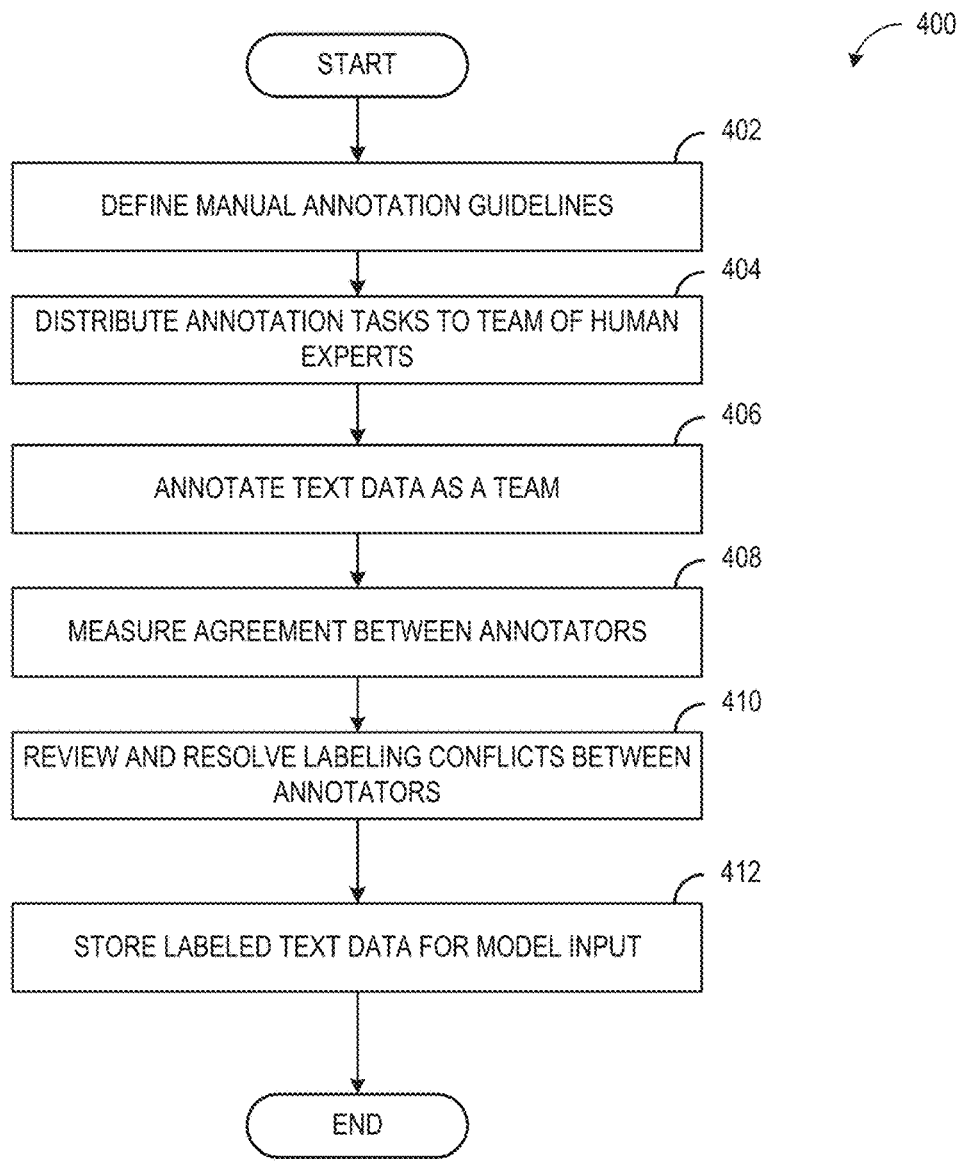
FIG. 4 is a flowchart illustrating an exemplary method for manually annotating text data as part of a collaborative process, in accordance with one or more embodiments of the present disclosure.

Referring now to FIG. 4, an exemplary high-level method 400 is shown for manually annotating unstructured text using a collaborative approach, where a team of human experts collectively label instances of entities in text data. Method 400 may be carried out using an text annotation system, such as text annotation system 102 of FIGS. 1A and 1B. Various steps of method 400 may be performed by the human experts using one or more GUIs of the text annotation system, such as the GUIs described below in reference to FIGS. 5A-7.

Method 400 begins at 402, where method 400 includes defining a set of manual annotation guidelines that will guide the manual annotation process. Defining the set of manual annotation guidelines may include defining a type of labeling or annotation task to be performed. The manual annotation task may include, for example, entity recognition, named-entity recognition (NER), relation extraction, document classification, or a different type of annotation.

For document classification, defining the set of manual annotation guidelines may include defining various different classifications into which a document may be classified. For relation extraction, defining the set of manual annotation guidelines may include defining types of relations to extract. For entity recognition, defining the set of manual annotation guidelines may include defining a list of entities that are desired to be labeled in the text data. The selection of the entities to be labeled may depend on a set of demands of a user of the text annotation system, where different users may wish to label different types of text content in various different domains. For example, a first user or set of users may wish to label financial text data, and may select a first list of entities of interest in the financial text data. A second user or set of users may wish to label medical text data, and may select a second list of entities of interest in the medical text data, where the second list of entities is different from the first list of entities. A third user or set of users may wish to label marketing text data, and may select a third list of entities of interest in the marketing text data, where the third list of entities is different from the first and second lists of entities.

Defining the set of manual annotation guidelines may also include determining how the entities will be labeled. In various embodiments, instances of entities may be labeled using a markup language. A first markup tag may be inserted immediately before the instance, and a second markup tag may be inserted immediately after the instance. For example, a state identified in the text data may be labeled as "<state>California</state>" to label California as being an instance of the entity "state". In other embodiments, a different type of markup language, or a different type of identifier may be used to label words or text expressions associated with a defined entity. By labeling the instances with the markup language or different identifier, the word or text expression may be identified by the text annotation system.

Entities may be hierarchically structured, whereby defining the set of manual annotation guidelines may also include defining hierarchical relationships between entities in the list of entities. For example, the text data may include a list of potential clients of a company. The company may wish to extract address information of the potential clients, to populate a database used for lead generation. A first entity for "address" may be defined, so that full addresses of the potential clients may be extracted from the text data. A second entity for "state" may be defined, so that the potential clients may be geographically divided up among a plurality of sales people based on location. The entity "state" may be defined as under or within the entity "address" in a hierarchy of entities.

When entities are defined within a hierarchy, entity labels may be assigned to the entities in a nested fashion. In embodiments where a markup language is used, a second set of markup tags may be included within a first set of markup tags. For example, a first entity may be "phone number", and a second entity may be "area code", where the second entity is part of the first entity. Instances of both entities may be labeled in the nested fashion, for example, as <phone number><area code>503</area code>2345000</phone number>.

Defining the set of manual annotation guidelines may also include defining a scope of one or more entities. As one example, for some entity extraction tasks, a user may wish to include words adjacent to an entity, such as descriptors. For example, instances of an entity "pizza" may be labeled in the text data. However, the user may wish to view types of pizza mentioned in the text data, without defining different entity types for different types of pizza. The user may expand a scope of the entity "pizza" to encompass words found prior to instances of the entity "pizza", whereby expressions such as "cheese pizza", "pepperoni pizza", etc. may be included within entity labels assigned to the instances.

In some embodiments, the annotation guidelines may include text, image and video representations to efficiently convey an annotation task.

At 404, method 400 includes distributing annotation tasks to a team of human experts. In various embodiments, manual annotation of text data may be performed by a team of annotators, where each annotator is responsible for annotating or labeling the same text data. When the team of annotators annotate or label the same text data, a agreement may be achieved between each member of the team regarding each annotation or label, which may increase a quality and/or standardization of the labeled instances. In other embodiments, not all the text data may be annotated by each team member. For example, a first portion of text documents may be distributed to a first group of team members; a second portion of the documents may be distributed to a second group of team members; a third portion of the documents may be distributed to a third group of team members; and so on.

The documents may be distributed to team members on the text annotation system, such that each annotator may log into the system and open the text data assigned to them in a manual annotation GUI. The annotator may use the manual annotation GUI to label instances of entities or otherwise annotate the document. Once each annotator has finished annotating a document, the annotator may submit the labeled document, whereby the labeled document may be stored for a subsequent review step.

At 406, method 400 includes annotating documents as a team. As described above, the text data may be annotated using the manual annotation GUI.

Figure 5A:
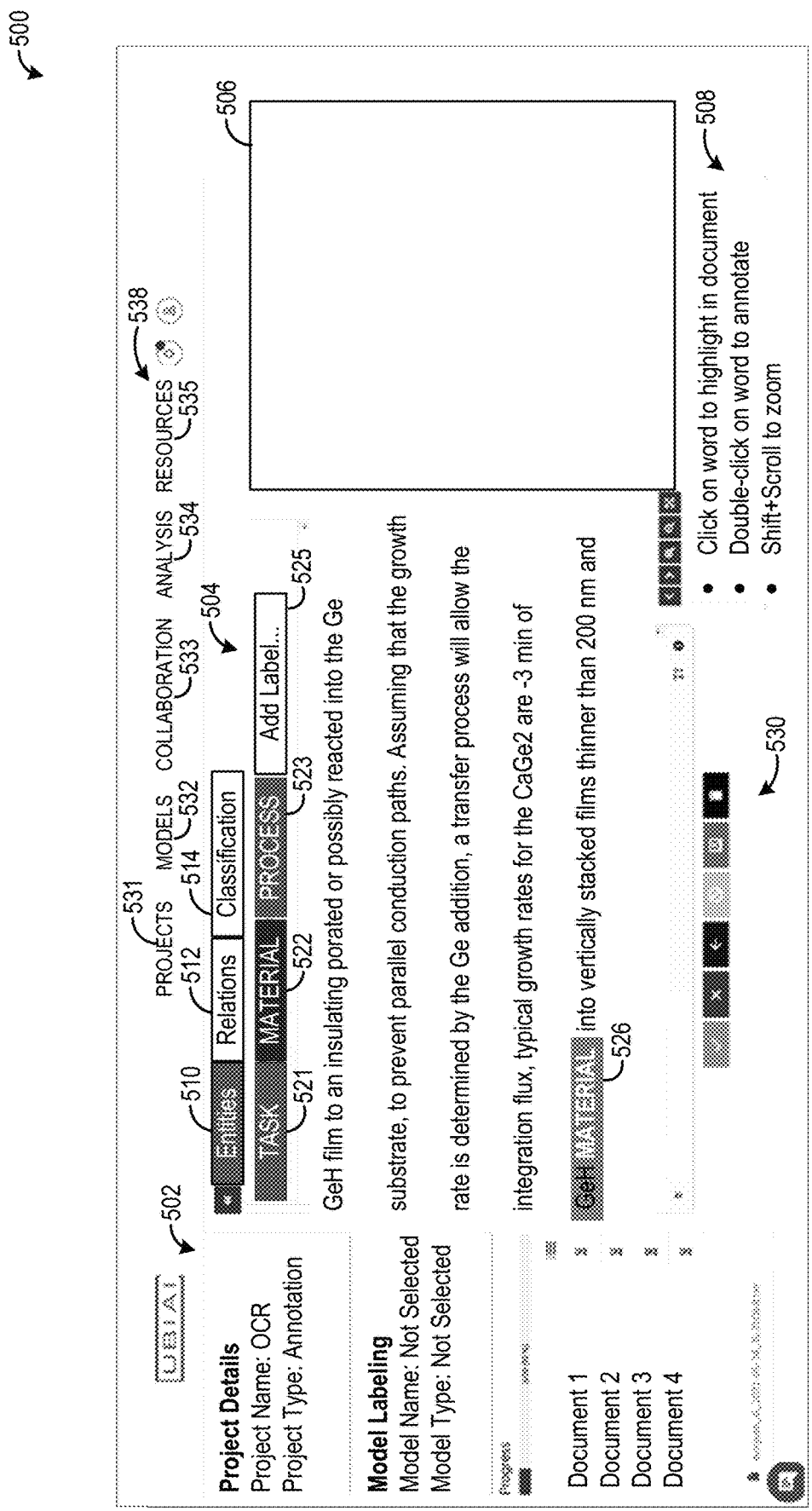
FIG. 5A shows an example GUI for manually labeling entities in text documents, in accordance with one or more embodiments of the present disclosure.
Figure 5B:
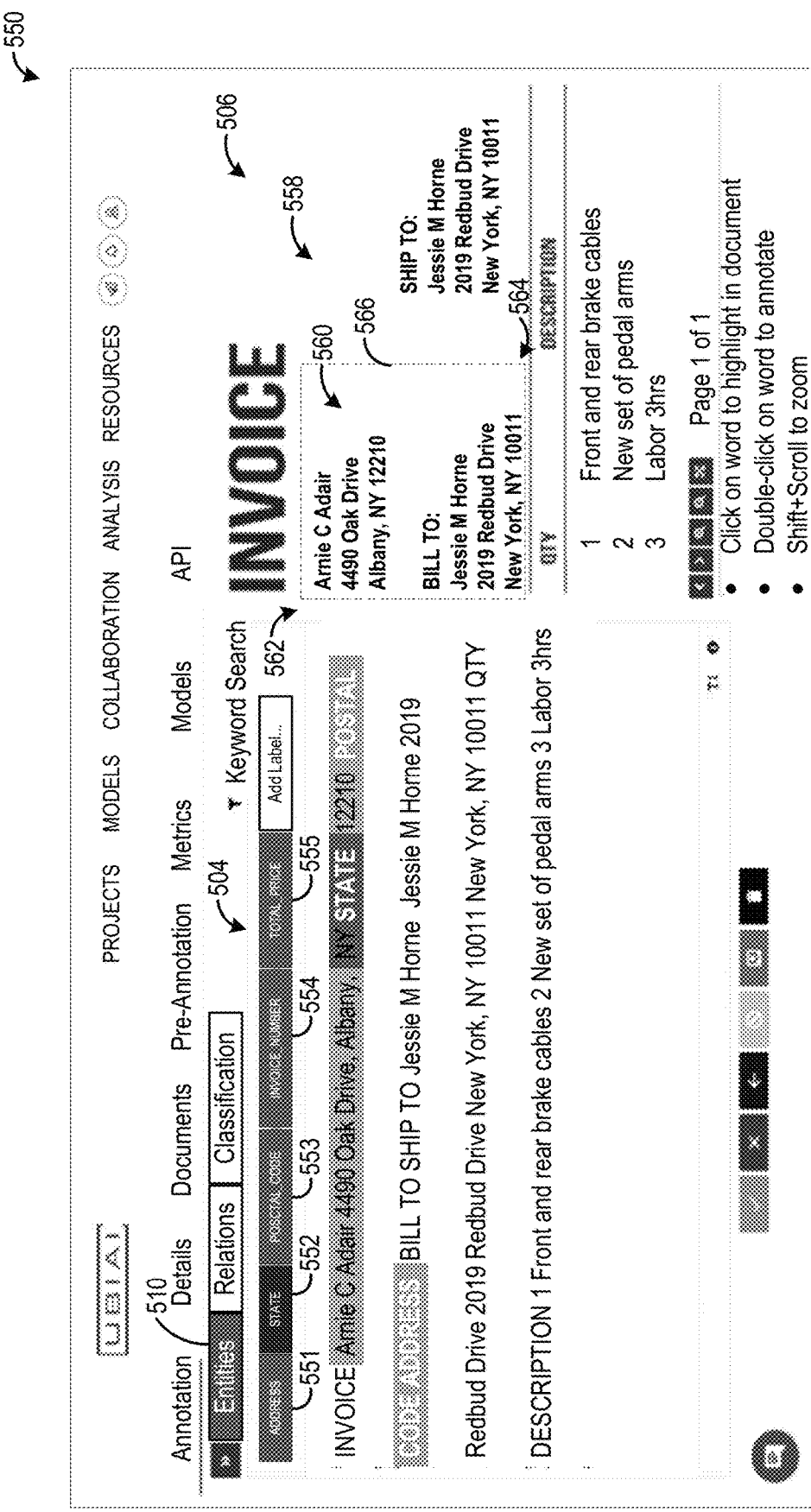
FIG. 5B shows an example of manually labeling nested entities in unstructured text using the GUI of FIG. 5A, in accordance with one or more embodiments of the present disclosure.
Figure 6:
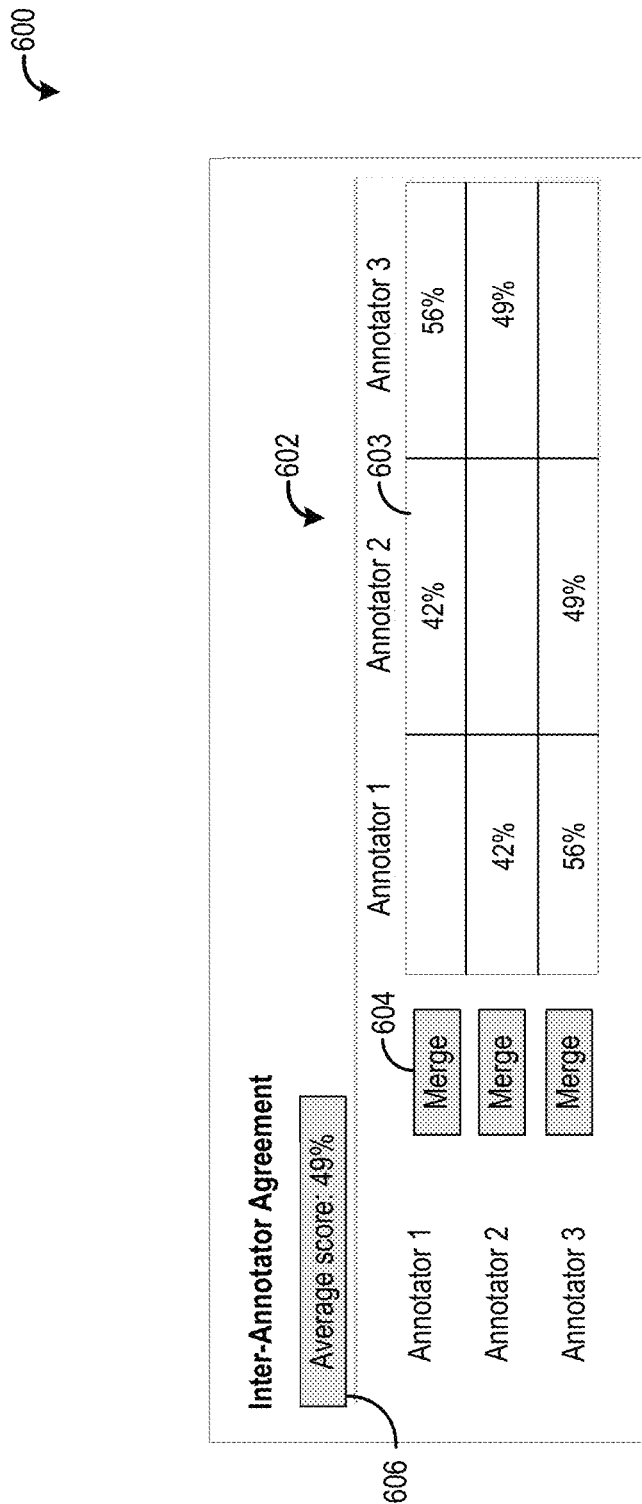
FIG. 6 shows an example GUI showing an agreement between entity labels assigned by different human annotators, in accordance with one or more embodiments of the present disclosure.

FIG. 5A shows an exemplary manual annotation GUI 500, which may be used to manually annotate text data. GUI 500 may be launched by a user via an text annotation system (e.g., text annotation system 102). For example, each member of the team may be assigned text data to annotate (e.g., by a manager of a data labeling process), and when the team member logs into the text annotation system and launches GUI 500, copies of the text data may be selected by the user or automatically uploaded to GUI 500 for annotation.

The text data may include various files that may be in a variety of formats, including native PDFs, TXT, CSV, HTML, DOCX, JSON, etc. Additionally, image files of text documents, such as PNG or JPG files, may also be uploaded for processing via OCR, where the OCR processing may occur on the system. For example, when the user uploads an image file of a document, the user may be prompted to generate a text document from the image using OCR, or the user may select conversion to text via OCR, via a menu of the system.

GUI 500 may be used by a single user to annotate the text data, or GUI 500 may be used by a plurality of users to annotate the text data as part of a collaborative effort. In some embodiments, each user of the plurality of users may view and annotate their own copy of the text data, and the different annotated copies of the text data may be merged, as described in greater detail below. As the user(s) edit the copies, inserting annotations as described herein, the copies may be periodically or regularly saved and ultimately outputted by GUI 500.

Manual annotation GUI 500 includes a project information pane 502, an editing pane 504 within which text data is displayed and may be annotated, and a reference pane 506 within which an original document of the text data is displayed (e.g. with original formatting). An instruction pane 508 is also included, which may provide instructions to the user regarding functionalities of GUI 500. Information pane 502 may include various details about a project, including a name and type of document displayed in editing pane 504 and reference pane 506; a name and type of a model selected to be trained using an output of GUI 500, if selected; and names and other information about additional documents of the text data that are available for viewing and annotating via GUI 500.

In the embodiment depicted in FIG. 5A, text is displayed in editing pane 504 in a tabbed display, where different tabs represent different types of annotation tasks. A first tab 510 may be selected to label entities in the text data; a second tab 512 may be selected to label relations in the text data; and a third tab 514 may be selected to perform a document classification task. In other embodiments, a greater or lesser number of tabs may be included, representing additional or different annotation tasks. In FIG. 5A, first tab 510 is selected, indicating that an entity labeling task is being performed, on text data corresponding to a text document. The text document is displayed in reference pane 506, where the original formatting of the text document can be seen. Raw text data of the text document is displayed in editing pane 504, which does not include the original formatting.

Editing pane 504 includes a plurality of control elements (e.g., buttons) corresponding to various different entities, instances of which are desired to be labeled in the text data. The plurality of control elements indicating entities selected for the invoice include a first button 521 for the entity "task"; a second button 522 for the entity "material"; and a third button 523 for the entity "process". Buttons 521-523 may be assigned different background colors, or a different visual feature may be used to distinguish between buttons 521-523. An additional button 525 may be selected to add a new entity to the display. The user may use button 525 to initially select a desired number of entities to generate buttons 521-523, and may then edit the text by selecting the buttons.

For example, a labeled instance 526 shows a label generated for the expression "GeH", where the label indicates that "GeH" is an instance of the entity "material". To generate the label, the user may highlight the expression "GeH" using a cursor of GUI 500. The user may select second button 522 for the entity "material", while the expression "GeH" is highlighted. When the user selects second button 522, a label may be inserted in the text data indicating that "GeH" is in instance of the entity "material". For example, a first markup tag may be inserted at a beginning of a span of the highlighted text, and a second markup tag may be inserted at an end of the span of the highlighted text, such that the span of the highlighted text is labeled by the first markup tag and the second markup tag. The markup tags may be recognized by GUI 500, and GUI 500 may insert one or more visual elements at the location of the highlighted text, to indicate the relevant entity. For example, a background color of the word "GeH" may be changed to a background color associated with the entity "material" (e.g., black). A "material" tag may be inserted into the text data, or a different visual element may be used.

GUI 500 may include various other control elements 530, which may be used, for example, to navigate between a plurality of files/documents that may be available for editing via GUI 500. Additionally, GUI 500 includes a menu 538, which may be used access various functionalities of GUI 500. A projects menu item 531 may link to project-specific GUIs, data, or functionalities. A models menu item 532 may link to model-specific resources or functionalities. A collaboration menu item 533 may link to one or more GUIs or resources used for collaborating with other users, such as, for example, GUIs for resolving labeling conflicts between users, as described below in reference to FIGS. 6 and 7. An analysis menu item 534 may link to analytic resources or functionalities. A resources menu 535 may link to other resources available via GUI 500 and/or the text annotation system. It should be appreciated that the examples provided herein are for illustrative purposes, and other controls and/or menus may be included in GUI 500 without departing from the scope of this disclosure.

In various embodiments, text content in reference pane 506 may be selected (e.g., with the cursor). When the text content is selected, corresponding text in editing pane 504 may also be selected. Thus, when annotating a document in editing pane 504, as an alternative to selecting text in editing pane 504 and inserting an entity label by selecting a desired entity button, the user may select an instance of an entity to label in reference pane 506, and insert the entity label by selecting the desired entity button. For some types of documents, finding an instance of an entity in reference pane 506 may be easier than finding the instance of an entity in editing pane 504. For example, if a document displayed in reference pane 506 is in a format that does not include sentences, such as the invoice depicted in FIG. 5A, an individual word or expression may be easily referenced by a position of the individual word or expression within the document. The individual word or expression may not be easily referenced in an unformatted, raw text view displayed in editing pane 504, where the user may have to read the unformatted, raw text carefully and scroll within editing pane 504 to find the word or expression. As a result, an amount of time spent annotating the document may be reduced by selecting instances of entities in reference pane 506 as opposed to editing pane 504.

An additional advantage of selecting text in editing pane 504 by selecting an area of the OCR document is that nested entities may be labeled in a fast and intuitive way. With a formatted OCR document, text expressions may be grouped together in meaningful groupings at specific locations within the OCR document, where a positioning of the meaningful groupings may be leveraged to more efficiently annotate the text expressions. A hierarchical structure of the formatted OCR document may lend itself to nesting of a plurality of entities in a hierarchical manner.

For example, an invoice displayed as an OCR document in manual annotation GUI 500 may include client contact information that is grouped at a specific location of the OCR document. The client information may include a name of the client; a phone number of the client; an address of the client; an email address of the client; a website of the client; and so on. It may be desirable for the user to label all of the text included at the specific location as a first type of entity, such as "contact information". Within the text included in the contact information, it may be desirable to label individual text expressions such as "email address" or "address". Within the text included in the entity "address", it may be desirable to label text expressions for "street", "city", "state", and so on.

Using other software or platforms, labeling each of these text expressions may entail scanning through the text of a text editor to determine a start of a first span of a contact information section. The user would select the start of the contact information section, and scroll the cursor across and/or down until the user detected an end of the first span of the contact information section, thereby selecting the text between the start and the end of the first span. The user may label the selected text in one of a variety of ways (e.g., selecting a control element, entering in a reference tag, etc.). After labeling the contact information, the user would then proceed back to the start of the first span of the contact information, and scan through the contact information section for a start of a second span of an address. The user may select the start of the address information, and scroll the cursor across and/or down until the user detected an end of the second span of the address information, thereby selecting the text between the start and the end of the second span of the address information. The user may label the highlighted text of the second span as an instance of an address. The user would then proceed back to the start of the second span of the address section to identify a start and an end of spans for each element of the address, and so on.

Using GUI 500, this cumbersome and time consuming process may be shortened and made more efficient. Rather than scanning for starting and ending points of various text phrases in a manner that may involve scanning repeatedly through the same sections of text, the user may select a first bounding box delineating the contact information, and select a relevant control element to label the contact information. The user may select a second bounding box delineating the address, and select a relevant control element to label the address. The user may select additional bounding boxes delineating the individual components of the address, and select relevant controls to label the individual components. In this way, an amount of time taken by the user to annotate the nested entities of the OCR document may be significantly reduced.

As an example, FIG. 5B shows a partial view 550 of GUI 500, where a portion of an invoice 558 in an image file displayed in reference pane 506 has been selected. Partial view 550 includes a first button 551 for the entity "address"; a second button 552 for the entity "state"; a third button 553 for the entity "postal code"; a fourth button 554 for the entity "invoice number"; and a fifth button 555 for the entity "total price".

As can be seen in FIG. 5B, text displayed in editing pane 504 of the manual annotation GUI may not include original formatting of the OCR document (e.g., the invoice 558) in reference pane 506. In other words, the output of the OCR software may lack the formatting of the OCR document, or may include different formatting from the OCR document. Because of the different formatting, it may be difficult for a user to find text expressions in the text of editing pane 504 that correspond to expressions in formatted text of the OCR document in reference pane 506. As a result, an amount of time taken by the user to annotate the OCR document in editing pane 504 may be increased.

To address this, in various embodiments, the user may select text expressions in the OCR document (e.g., displayed on the right in FIG. 5B) using the cursor, where the selected text is highlighted in the text displayed in the editing pane. For example, the user may select a button of a mouse (or similar input device) at a first point 562 within the OCR document displayed in reference pane 506, and drag the cursor across a section of text of the OCR document to a second point 564 within the OCR document to select an area 560 of the OCR document. Text within the selected area 560 may be highlighted in the OCR document. The platform may calculate a bounding box 566 of the selected area of the OCR document, based on first point 562 and second point 564. From bounding box 566, the text annotation system may determine one or more text expressions included within the bounding box. The platform may then search the text in editing pane 504 (displayed to the left of the OCR document in FIG. 5B), and select (e.g., and highlight) the text in editing pane 504 that corresponds to the text in the bounding box of the selected area of the OCR document.

As can be seen in FIG. 5B, bounding box 566 (and area 560) include name and address information of the invoice. In reference pane 506, the address information is displayed in a traditional address format, on multiple lines of invoice 558. In editing pane 504, the address information is displayed in a paragraph format. After area 560 is selected, in editing pane 504, the address information may be highlighted, such that the user may easily find the address in editing pane 504. The user may then select the entire address in editing pane 504, and select first button 551 for "address" to label the address in editing pane 504. The user may then select the postal code in editing pane 504, and select the third button 553 for "postal code" to label the postal code. The user may then select the state in editing pane 504, and select second button 552 for "state" to label the state. As a result, nested entities STATE and POSTAL CODE are displayed within the global entity ADDRESS in editing pane 504. In this way, the user may quickly and efficiently identify and label text in editing pane 504 that corresponds to areas of interest in the formatted OCR document. Further, this enables users to encode hierarchical relationship between entities to train more performant models. In some embodiments, selecting text in reference pane 506 may also select corresponding text in editing pane 504, such that when the user selects an appropriate control element, the label is inserted without the user having to select text in editing pane 504.

In some cases, labeling text in editing pane 504 that corresponds to areas of interest in the formatted OCR document may include removing an existing, incorrect label, and inserting a correct label. For example, a user may mistakenly select the wrong button, or the user may be reviewing and correcting text previously labeled by another annotator. In such cases, removing the existing, incorrect label may be advantageously facilitated by a similar procedure, where after labeled text is selected and highlighted in editing pane 504 by selecting the text in reference pane 506, a control element corresponding to the existing, incorrect label may be selected to remove the existing, incorrect label. After the existing, incorrect label has been removed, a desired label may be inserted (e.g., replacing the existing, incorrect label) by selecting a control element associated with the desired label, as described above.

Returning to method 400, at 408, method 400 includes measuring a agreement between annotations made by different members of the team of human experts. To measure the agreement, the text annotation system may compare each labeled copy of a document annotated by a team member with other labeled copies of the document annotated by other team members. For example, the text annotation system may extract a total number of instances of an entity in a first labeled copy produced by a first team member. The text annotation system may extract a total number of instances of the entity in a second labeled copy produced by a second team member. Each instance extracted from the first labeled copy may be compared with a corresponding instance extracted from the second labeled copy. If an entity used to label the instance in the first labeled copy matches an entity used to label the instance in the second labeled copy, an agreement of the entities may be recorded. If the entity used to label the instance in the first labeled copy does not match the entity used to label the instance in the second labeled copy, a disagreement of the entities may be recorded. The text annotation system may calculate a percentage of agreements between the entities assigned by each team member of the team of collaborators. The percentage of agreements may be displayed to the user in a GUI of the text annotation system.

Referring briefly to FIG. 6, an example inter-annotator agreement GUI 600 is shown. In one embodiment, the inter-annotator agreement GUI 600 may be generated automatically by the text annotation system, for example, as different team members submit or upload annotated documents to the text annotation system (e.g., from a manual annotation GUI 500).

In the embodiment of GUI 600 depicted in FIG. 6, percentages of agreements between three annotators are shown in a 3×3 inter-annotator agreement matrix 602. Names of the three annotators are displayed in horizontal rows and vertical columns of inter-annotator agreement matrix 602, such that a percentage agreement between any two annotators of the three annotators may be indicated in a cell 603 of inter-annotator agreement matrix 602, where cell 603 is at an intersection of a row corresponding to a first annotator of the any two annotators, and a column corresponding to a second annotator of the any two annotators. An average score across all annotators may be displayed in an average score field 606. During a conflict resolution stage, the percentage agreements may be adjusted as conflicts between the annotators are resolved. When the conflicts between two annotators have been resolved, the percentage agreement indicated in the relevant cell 603 may indicate 100% agreement between labeled copies of the text data. When 100% agreement is achieved, a merge button 604 may be selected to merge the respective labeled copies of the text data.

Returning to method 400, at 410, method 400 includes reviewing conflicts between annotations made by different members of the team. When labeling conflicts occur, in various embodiments, a user may resolve the conflicts using a conflict resolution GUI of the text annotation system.

FIG. 7 shows an example conflict resolution GUI 700. Conflict resolution GUI 700 may be launched, for example, by a manager of a data labeling process, where the manager wishes to review and/or compare labels assigned by two different human annotators. Conflict resolution GUI 700 includes two editing panes positioned side by side. A first editing pane 702 corresponds to a first annotator, and a second editing pane 704 corresponds to a second annotator. The text data displayed in first editing pane 702 and second editing pane 704 may be the same, meaning, that the text data may originate from a same original document. Annotations of the text data made by the first annotator (e.g., via GUI 500) are displayed in first editing pane 702, and annotations of the text data made by the second annotator (e.g., also via GUI 500) are displayed in second editing pane 704. Further, labeled text data displayed in first editing pane 702 may be the same as the labeled text data displayed in a first editing pane used by the first annotator (e.g., editing pane 504 of GUI 500) during the data labeling process, and labeled text data displayed in second editing pane 704 may be the same as the labeled text data displayed in a second editing pane used by the second annotator during the data labeling process. As a result of the side-by-side positioning of first editing pane 702 and second editing pane 704, a user may easily compare a first annotated instance of an entity in first editing pane 702 with a second annotated instance of the entity in second editing pane 704.

In both first editing pane 702 and second editing pane 704, instances in the text data of three entities have been labeled, including a first entity "task" indicated by a first button 710; a second entity "process" indicated by a second button 712; and a third entity "material" indicated by a third button 714. For example, a first text expression 720 "Ydj 1" is labeled as being an instance of the entity "material" both by the first annotator, as seen in first editing pane 702; and by the second annotator, as seen in second editing pane 704. However, a second text expression 722 "class BJ—protein (Hsp40)" in first editing pane 702 is labeled as an instance of the entity "material", while in second editing pane 704, second expression 722 is divided into a third text expression 724 "class BJ—protein" and a fourth text expression 726 "(Hsp40)", where third text expression 724 and fourth text expression 726 are each labeled as instances of the entity "material". Thus, a labeling conflict exists between the first annotator and the second annotator with respect to second text expression 722.

To resolve the conflict, the user may highlight a preferred entity label of two conflicting entity labels using a cursor, in either first editing pane 702 or second editing pane 704. When the preferred entity label is highlighted, a corresponding conflicting entity label in the opposing editing pane may also be highlighted. The user may resolve the conflict by selecting the highlighted preferred entity to confirm the preferred label. When the preferred label is confirmed, the conflicting label may be changed to match the preferred label, and the instances of the entity may no longer be highlighted in both instances of the document.

After conflicts between first editing pane 702 and second editing pane 704 have been resolved manually by the user, the text of first editing pane 702 and second editing pane 704 may be identical, whereby the text may be merged. For example, after manually resolving the conflicts, an inter-annotator agreement matrix (e.g., inter-annotator agreement matrix 602 of FIG. 6) may be displayed to the user. The inter-annotator agreement matrix may show an agreement of 100% between the two instances. The user may select a "merge" control element (e.g., merge button 604) of the inter-annotator agreement matrix to merge the two instances of the document.

As conflicts in different copies of the text data are resolved, the number of documents with conflicts in the inter-annotator agreement matrix may decrease, until all of the conflicts between the different copies of the text data have been resolved and a single version remains.

Returning to method 400, at 412, method 400 includes storing the labeled text data resulting from the conflict resolution (e.g., labeled text data 216) on the entity recognition system, where it may be accessed for use in training one or more ML models, as described above in reference to FIG. 2. Method 400 ends.

Thus, a single, integrated text annotation system is disclosed where the user can perform various stages of an end-to-end process for annotating and/or extracting entities from text data. By supporting the various stages via the single, integrated text annotation system, an amount of time spent by the user preparing and annotating data, for example, for training an ML model, may be reduced. For example, to perform entity extraction using other types of software, a first software application may be used to pre-annotate the data. The output of the first software application (partially labeled data) may then be inputted into a second software application for manual annotation by the human experts. The output of the second software application may then be inputted into a third software application for training a model. If more than one model is desired to be used, additional platforms may be used. Each different software application may be accessed from different servers using different credentials, which may entail maintaining multiple commercial relationships. A client may be exposed to an increased security risk as a result of processing data on multiple servers and using multiple applications, each of which could be insecure, whereas the text annotation system described herein may maintain data security via a single login. Additionally, each time the data is processed by a different software application, memory and processing resources may be reallocated. By performing the tasks entailed by each stage of the entity extraction process on a single compute instance, computing resources may be more efficiently managed, reducing processing time and associated costs.

In particular, an amount of time spent manually annotating text data may be substantially reduced by using a few shot labeling approach, where an LLM is used to pre-annotate the text data based on a small number of manually labeled example sentences or phrases. An output of the LLM may be reviewed and manually annotated to ensure a quality of the labeled text data. The manual annotation may be performed using a collaborative procedure supported by various GUIs of the text annotation system. When the labeled text data achieves a desired quality, the labeled text data may then be used to generate a training set for training a smaller, more specific ML model to label new text data uploaded to the text annotation system. For example, unlike the LLM, the ML model may be trained on data within a specific domain, to increase an accuracy of an output of the ML model.

During manual annotation via a manual annotation GUI, an additional advantage of the text annotation system described herein is that a formatting of text in some documents, such as documents originating from image files where text is generated using OCR software, may be leveraged to more efficiently label nested entities. Hierarchically organized entities, such as found in an ontology, may allow for greater identification of relevant portions of text. However, manually labeling nested entities may introduce a level of complexity and repetition that may increase an amount of time spent labeling documents. By allowing users to select text expressions directly in original image files, the amount of time spent labeling the documents may be reduced, decreasing an overall amount of time, effort, resource use, and cost of labeling text data.

The technical effect of using few shot labeling via an LLM to pre-annotate text data, and performing a manual annotation process via one or more GUIs of a text annotation system that support efficient manual labeling of the text data, is that an amount of time and a cost of manual labeling may be reduced.

The disclosure also provides support for a method for labeling text data, the method comprising: manually labeling one or more words in a portion of a first set of text data as instances of a predefined entity of interest, extracting one or more example phrases from the labeled portion of text data, each example phrase of the one or more example phrases including at least one labeled instance of the predefined entity of interest, submitting an instruction to a Large Language Model (LLM) to label instances of the predefined entity of interest in the first set of text data, the instruction including the one or more example phrases, training a machine learning (ML) model to label instances of the predefined entity of interest in a second set of text data, using training data including the labeled text data of the first set of text data, the labeled text data outputted by the LLM. In a first example of the method, the method further comprises: performing the manual labeling the one or more words, the extracting of the one or more example phrases, the submitting the instruction to the LLM, and the training the ML model using a plurality of graphical user interfaces (GUI) of a single, integrated text annotation system. In a second example of the method, optionally including the first example, the method further comprises: pre-annotating the first set of text data or the portion of the first set of text data based on one or more rule-based algorithms, the one or more rule-based algorithms customizable and/or configurable by a user of the text annotation system. In a third example of the method, optionally including one or both of the first and second examples, a rule-based algorithm of the one or more rule-based algorithms changes an instance of the entity of interest based on the instance matching a pattern described by a regular expression defined in the text annotation system. In a fourth example of the method, optionally including one or more or each of the first through third examples, the method further comprises: manually annotating the labeled text data prior to training the ML model using a manual annotation GUI of the text annotation system. In a fifth example of the method, optionally including one or more or each of the first through fourth examples, manually annotating the labeled text further comprises: distributing a plurality of copies of the labeled text to a team of manual annotators via the text annotation system, receiving annotated text data from each member of the team of manual annotators, measuring an agreement between annotations made by each member of the team of manual annotators, and displaying the agreement in an inter-annotator agreement GUI of the text annotation system, resolving conflicts in labels assigned by each member of the team of manual annotators, via a conflict resolution GUI of the text annotation system, in response to the agreement exceeding a threshold agreement, storing the annotated text data on the text annotation system for training the ML model. In a sixth example of the method, optionally including one or more or each of the first through fifth examples, the text data is generated by the text annotation system from an image using optical character recognition (OCR), and manually annotating the labeled text data using the manual annotation GUI further comprises: displaying the image in a reference pane of the manual annotation GUI, receiving a user selection of a first area of the image via a cursor of the manual annotation GUI, detecting a first portion of text positioned within the first area, highlighting a second portion of the labeled text data corresponding to the first portion of text, in an editing pane of the manual annotation GUI, labeling the highlighted second portion of the labeled text as an instance of a first entity of interest, the first entity of interest selected by a user via a first control element of the manual annotation GUI. In a seventh example of the method, optionally including one or more or each of the first through sixth examples, the method further comprises: receiving a user selection of a second area of the image via the cursor of the manual annotation GUI, the second area located within the first area, detecting a third portion of text positioned within the second area, highlighting a fourth portion of the labeled text data corresponding to the third portion of text in the editing pane of the manual annotation GUI, labeling the highlighted fourth portion of the labeled text as an instance of a second entity of interest, the second entity of interest selected by the user via a second control element of the manual annotation GUI. In an eighth example of the method, optionally including one or more or each of the first through seventh examples, labeling the highlighted second portion of the labeled text as an instance of a first entity of interest further comprises: removing an existing label for the highlighted second portion of the labeled text, the existing label selected by a user via a corresponding control element of the manual annotation GUI, and labeling the highlighted second portion of the labeled text as an instance of the first entity of interest, the first entity of interest selected by a user via the first control element of the manual annotation GUI.

The disclosure also provides support for an text annotation system, comprising: a processor configured to execute instructions stored in a non-transitory memory of the text annotation system to: train one or more ML models to label entities of interest in a first set of text data, using ground truth data including a labeled version of the first set of text data, the labeled version including instances of the entities of interest labeled by a Large Language Model (LLM), store the one or more trained ML models on the text annotation system, and use the one or more trained ML models to label the entities of interest in a second set of text data. In a first example of the system, further instructions are stored in the non-transitory memory that when executed, cause the processor to change one or more instances of an entity in the first set of text data, prior to labeling by the LLM, based on a rule-based algorithm that determines whether the one or more instances of the entity match a pattern defined by a regular expression. In a second example of the system, optionally including the first example, the regular expression is configured by a user of the text annotation system. In a third example of the system, optionally including one or both of the first and second examples, the regular expression is selected from a plurality of regular expressions stored in the text annotation system, via a GUI of the text annotation system. In a fourth example of the system, optionally including one or more or each of the first through third examples, the labeled version of the first set of text data is edited by one or more users of the text annotation system using one or more of a manual annotation graphical user interface (GUI) of the text annotation system, an inter-annotator agreement GUI of the text annotation system, and a labeling conflict resolution GUI of the text annotation system.

The disclosure also provides support for a method for an text annotation system, the method comprising: receiving a first user selection of a first area of an image of a document, the image loaded into a manual annotation graphical user interface (GUI) of the text annotation system, the first area including text, determining a first bounding box of the first area of the image, based on coordinates of the first bounding box, selecting a first portion of text of a text document displayed in an editing pane of the manual annotation GUI, the text document generated from the image using optical character recognition (OCR), the first portion of text including the text included within the first area of the image, and labeling the first portion of text in the text document with a first label selected by the user via the manual annotation GUI. In a first example of the method, the method further comprises: receiving a second user selection of a second area of the image, the second area included within the first area, the second area including text, determining a second bounding box of the second area of the image, based on coordinates of the second bounding box, selecting a second portion of text of the text document, the second portion including the text included in the second area of the image, the second portion of text included within the first portion of text, and labeling the second portion of text in the text document with a second label selected by the user via the manual annotation GUI. In a second example of the method, optionally including the first example, prior to receiving either or both of the first user selection and the second user selection, the first portion of text is labeled using a Large Language Model (LLM), the LLM taking as an input one or more manually labeled example phrases drawn from the first portion of text. In a third example of the method, optionally including one or both of the first and second examples: receiving the first user selection further comprises receiving a selection of a first point and a selection of a second point in the image with an input device, the first point and the second point corners of the first bounding box, and receiving the second user selection further comprises receiving a selection of a third point and a selection of a fourth point in the image with the input device, the third point and the fourth point corners of the second bounding box. In a fourth example of the method, optionally including one or more or each of the first through third examples, the method further comprises: the user selecting the first point and the second point by selecting a button on the input device when a cursor of the manual annotation GUI is positioned over the first point, dragging the cursor to the second point using the input device, and releasing the button at the second point. In a fifth example of the method, optionally including one or more or each of the first through fourth examples: labeling the first portion of text with the first label selected by the user further comprises receiving a user selection of a first control element of the manual annotation GUI associated with a first entity of interest, and labeling the first portion of text as an instance of the first entity of interest, and labeling the second portion of text with the second label selected by the user further comprises receiving a user selection of a second control element of the manual annotation GUI associated with a second entity of interest, and labeling the second portion of text as an instance of the second entity of interest.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to,"

etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method for labeling text data, the method comprising:
    manually labeling one or more words in a portion of a first set of text data as instances of a predefined entity of interest;
    extracting one or more example phrases from the labeled portion of text data, each example phrase of the one or more example phrases including at least one labeled instance of the predefined entity of interest;
    submitting an instruction to a Large Language Model (LLM) to label instances of the predefined entity of interest in the first set of text data, the instruction including the one or more example phrases;
    training a machine learning (ML) model to label instances of the predefined entity of interest in a second set of text data, using training data including the labeled text data of the first set of text data, the labeled text data outputted by the LLM.

2. The method of claim 1, further comprising performing the manual labeling the one or more words, the extracting of the one or more example phrases, the submitting the instruction to the LLM, and the training the ML model using a plurality of graphical user interfaces (GUI) of a single, integrated text annotation system.

3. The method of claim 2, further comprising pre-annotating the first set of text data or the portion of the first set of text data based on one or more rule-based algorithms, the one or more rule-based algorithms customizable and/or configurable by a user of the text annotation system.

4. The method of claim 3, wherein a rule-based algorithm of the one or more rule-based algorithms changes an instance of the entity of interest based on the instance matching a pattern described by a regular expression defined in the text annotation system.

5. The method of claim 2, further comprising manually annotating the labeled text data prior to training the ML model using a manual annotation GUI of the text annotation system.

6. The method of claim 5, wherein manually annotating the labeled text further comprises:
    distributing a plurality of copies of the labeled text to a team of manual annotators via the text annotation system;
    receiving annotated text data from each member of the team of manual annotators;
    measuring an agreement between annotations made by each member of the team of manual annotators, and displaying the agreement in an inter-annotator agreement GUI of the text annotation system;
    resolving conflicts in labels assigned by each member of the team of manual annotators, via a conflict resolution GUI of the text annotation system;
    in response to the agreement exceeding a threshold agreement, storing the annotated text data on the text annotation system for training the ML model.

7. The method of claim 5, wherein the text data is generated by the text annotation system from an image using optical character recognition (OCR), and manually annotating the labeled text data using the manual annotation GUI further comprises:
    displaying the image in a reference pane of the manual annotation GUI;
    receiving a user selection of a first area of the image via a cursor of the manual annotation GUI;
    detecting a first portion of text positioned within the first area;
    highlighting a second portion of the labeled text data corresponding to the first portion of text, in an editing pane of the manual annotation GUI;
    labeling the highlighted second portion of the labeled text as an instance of a first entity of interest, the first entity of interest selected by a user via a first control element of the manual annotation GUI.

8. The method of claim 7, further comprising:
    receiving a user selection of a second area of the image via the cursor of the manual annotation GUI, the second area located within the first area;
    detecting a third portion of text positioned within the second area;
    highlighting a fourth portion of the labeled text data corresponding to the third portion of text in the editing pane of the manual annotation GUI;
    labeling the highlighted fourth portion of the labeled text as an instance of a second entity of interest, the second entity of interest selected by the user via a second control element of the manual annotation GUI.

9. The method of claim 7, wherein labeling the highlighted second portion of the labeled text as an instance of a first entity of interest further comprises:
    removing an existing label for the highlighted second portion of the labeled text, the existing label selected by a user via a corresponding control element of the manual annotation GUI; and
    labeling the highlighted second portion of the labeled text as an instance of the first entity of interest, the first entity of interest selected by a user via the first control element of the manual annotation GUI.

* * * * *